United States Patent [19]

Hashimoto et al.

[11] Patent Number: 5,787,487
[45] Date of Patent: Jul. 28, 1998

[54] INFORMATION STORAGE SYSTEM FOR CONVERTING DATA AT TRANSFER

[75] Inventors: Sunao Hashimoto; Shigehisa Kawabe; Kazunori Horikiri, all of Kanagawa, Japan

[73] Assignee: Fuji Xerox Co., Ltd., Tokyo, Japan

[21] Appl. No.: 822,146

[22] Filed: Mar. 21, 1997

Related U.S. Application Data

[63] Continuation of Ser. No. 350,146, Nov. 29, 1994, abandoned.

[30] Foreign Application Priority Data

Nov. 30, 1993 [JP] Japan ................................ 5-326198

[51] Int. Cl.$^6$ ............................................. G06F 13/16
[52] U.S. Cl. ........................... 711/165; 711/172; 395/888
[58] Field of Search .......................... 395/492, 497.03, 395/497.04, 413, 888; 711/165, 172, 173, 203

[56] References Cited

U.S. PATENT DOCUMENTS

| 5,040,075 | 8/1991 | Takayanagi | 358/300 |
| 5,063,499 | 11/1991 | Garber | 395/500 |
| 5,237,460 | 8/1993 | Miller et al. | 360/8 |
| 5,247,638 | 9/1993 | O'Brien et al. | 395/888 |
| 5,461,682 | 10/1995 | Nomura | 382/232 |
| 5,463,476 | 10/1995 | Oya | 358/426 |

FOREIGN PATENT DOCUMENTS

| JP 62-154152 | 7/1987 | Japan . |
| JP 4014154 | 1/1992 | Japan . |
| JP 4364547 | 12/1992 | Japan . |

OTHER PUBLICATIONS

Hennessy et al., "Computer Architecture A Quantitative Approach", 1990, p. 436.

*Primary Examiner*—Glenn Gossage
*Assistant Examiner*—Kevin L. Ellis
*Attorney, Agent, or Firm*—Finnegan, Henderson, Farabow, Garrett & Dunner, L.L.P.

[57] ABSTRACT

An information storage system includes an auxiliary memory unit, a data conversion unit for converting transfer data, a data transfer information memory unit for storing information on data transfer, a data conversion information memory unit for storing information on data conversion, and a storage managing unit, which manages the auxiliary memory unit, for transferring data to the auxiliary memory unit by using the data transfer information stored in the data transfer information memory unit, and at the time of data transfer, instructing the data conversion unit to convert data by using the data conversion information stored in the data conversion information memory unit.

18 Claims, 17 Drawing Sheets

FIG.2 (A)

PAGE TABLE

| LOGICAL ADDRESS | PHYSICAL ADDRESS | VIRTUAL BLOCK IDENTIFIER | UPDATING MARK |
|---|---|---|---|
| LA1 | PA1 | VBI1 | X |
| LA2 | PA2 | VBI2 | |
| LA3 | PA3 | VBI3 | X |
| ... | ... | ... | ... |

FIG.2 (B)

TEMPORARY MEMORY MANAGING TABLE

| PAGE BLOCK NO. | VBI/BI | UPDATING MARK |
|---|---|---|
| PBN1 | BI1 | |
| PBN2 | VBI1 | |
| PBN3 | VBI2 | X |
| ... | ... | ... |

FIG.2 (C)

DATA CONVERTING TABLE

| VBI | FIRST CONVERTING METHOD | SECOND CONVERTING METHOD | BLOCK IDENTIFIER SERIES OF BEFORE-CONVERSION DATA | BLOCK IDENTIFIER SERIES OF AFTER-CONVERSION DATA |
|---|---|---|---|---|
| VBI1 | TR1 | RTR1 | BI1 | VBI1,VBI2 |
| VBI2 | TR2 | RTR2 | BI1 | VBI1,VBI2 |
| VBI3 | TR3 | RTR3 | BI2,BI3 | VBI3,VBI4,VBI5 |
| ... | | | ... | ... |

LOGICAL ADDRESS SPACE

PHYSICAL ADDRESS SPACE

ADDRESS SPACE OF TEMPORARY MEMORY DEVICE

MAGNETIC DISC DEVICE

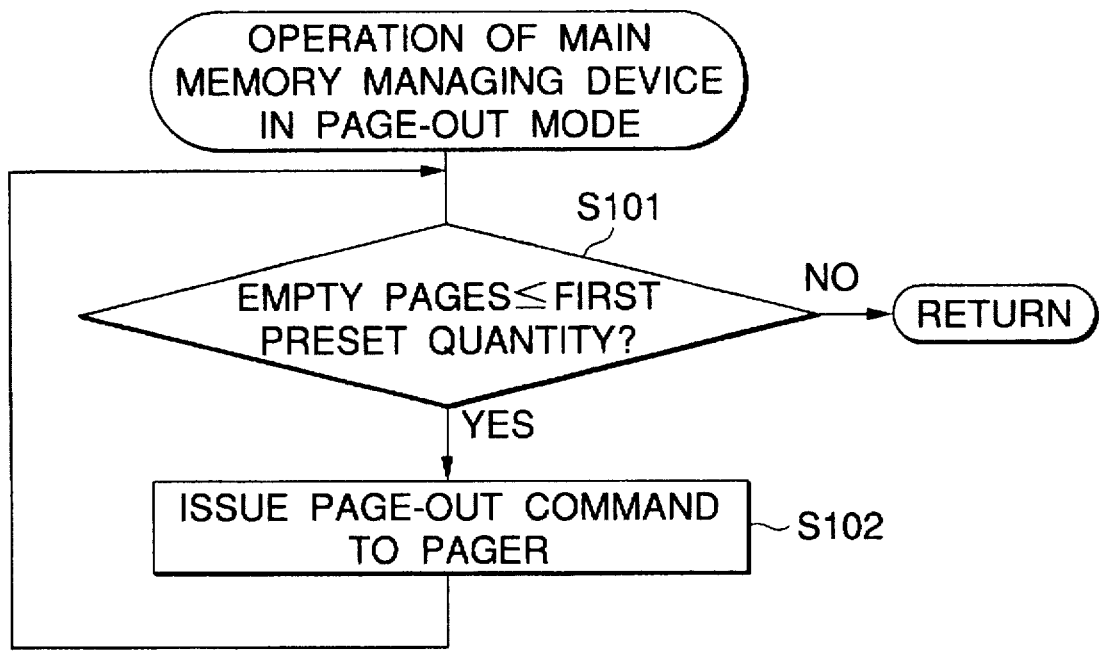
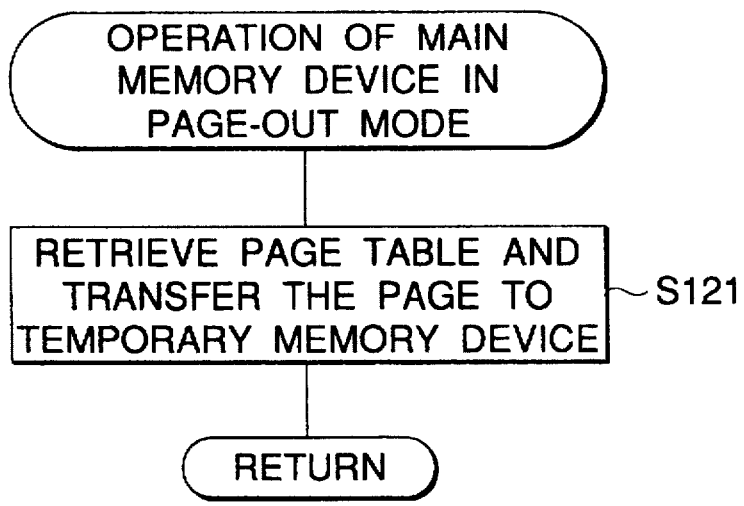

FIG.19

| | FIRST CONVERTING METHOD | SECOND CONVERTING METHOD | BLOCK IDENTIFIER SERIES OF BEFORE-CONVERSION DATA | BLOCK IDENTIFIER SERIES OF AFTER-CONVERSION DATA | KEY INFORMATION |
|---|---|---|---|---|---|
| VBI1 | TR1 | RTR1 | BI1 | VBI1,VBI2 | K1 |
| VBI1 | TR1 | RTR1 | BI1 | VBI1,VBI2 | K1 |
| VBI1 | TR2 | RTR2 | BI2,BI3 | VBI3,VBI4,VBI5 | K1 |
| ... | | | ... | ... | |

INFORMATION STORAGE SYSTEM FOR CONVERTING DATA AT TRANSFER

This application is a continuation of application Ser. No. 08/350,146, filed Nov. 29, 1994, now abandoned.

BACKGROUND OF THE INVENTION

1. Field of the Invention

The present invention relates to an information storage system with an auxiliary memory means, and more particularly to an information storage system well adaptable for a virtual memory system of the paging type.

2. Discussion of the Related Art

A conventional virtual memory system of the paging type includes a main memory device and an auxiliary memory device. The virtual memory area is divided into pages. The entire memory area of the main memory device is divided into page frames. Data is transferred every page between the main memory device and the auxiliary memory device. The virtual memory system of the paging type, which was used by a main frame computer in the initial stage, has prevailed to such an extent that it can be used by work stations and personal computers.

In a conventional virtual memory managing system, the data transfer between the auxiliary memory device and the main memory device is performed by the data per se transferred to the main memory device. The recent virtual memory system frequently handles large volumes of data in processing image data, for example. In processing image data, the paging operation requires an increase of the memory capacity of the auxiliary memory device, and an efficient data transfer between the auxiliary memory device and the main memory device become problematic.

To satisfy these requirements for the virtual memory system, the process of compressing and expanding image data at the time of the paging is used in some of the conventional virtual memory systems. In the systems disclosed in Japanese Patent Unexamined Publication Nos. Hei. 4-14154 and Sho. 62-154152, the data of the main memory device, after compressed, is written into an unused memory area in the auxiliary memory device. The data of the auxiliary memory device, after expanded, is written into the main memory device. With this approach, the memory area of the auxiliary memory device is saved, and the data transfer efficiency is improved since the data is transferred in the compressed form.

The data transfer to the auxiliary memory device also takes place in other situations than in the virtual memory system, for example, when a file is accessed. Also in this situation, the transfer speed is problematic. In the auxiliary memory device described in Japanese Patent Unexamined Publication No. Hei. 4-364547, information to be written is compressed and information to be read out is expanded at the time of writing and reading the information in order to increase the speed of writing and reading information to and from a disk.

The computers as information processing devices have been widespread and placed for personal use. In this recent circumstances, there is an increasing necessity of using pre-processings and post-processings, such as information coding, tone conversion of image information, and resolution conversion. These processings are inevitably and frequently carried out before and after a processing a user desires. For this reason, developing of such an information processing device that these processings are carried in the system is desired. Generally, the pre-processings and the post-processings, such as information coding, tone conversion of image information, and resolution conversion, are carried out by using a program designed specially for these processings or an application program incorporating these processings thereinto.

In the conventional virtual memory system and the auxiliary memory device, the compression/expansion processing can be carried out at the time of data transfer. However, there is no idea to carry out other processings than the compression/expansion processing at the time of data transfer. The reason for this is that the conventional system is designed placing an emphasis on achieving of efficient utilization of the auxiliary memory device and the improvement of the data transfer efficiency. Further, the conventional system inevitably carries out the data compression/expansion process at the time of data transfer. In other words, in the convention system, it is impossible to optionally select the execution of the data compression/expansion process at the time of data transfer in accordance with the kind of data, status of the system, user's intention, and the like. In handling file data having been processed for compression, image, and the like by an application program by another application program, the fact that the file data has undergone these data processings must be taken into consideration. In this respect, the conventional system is inflexible in handling the file data.

SUMMARY OF THE INVENTION

The present invention has been made in view of the above circumstances and has an object to provide an information storage system which is flexibly handled, with flexible data processing at the time of writing data into the auxiliary memory device and reading data out of the auxiliary memory device.

To attain the above object, the invention provides an information storage system including: auxiliary storage means; data conversion means for converting transfer data; data transfer information holding means for holding information on data transfer; data conversion information holding means for holding information on data conversion; and memory managing means, which manages the auxiliary storage means, for transferring data to the auxiliary memory means by using the data transfer information held in the data transfer information holding means, and at the time of data transfer, instructing the data conversion means to convert data by using the data conversion information held in the data conversion information holding means.

BRIEF DESCRIPTION OF THE DRAWINGS

FIG. 4 is a flowchart showing an example of operation flow of the main memory managing device in a page-out mode;

FIG. 6 is a flowchart showing an example of the operation flow of the main memory device in a page-out mode;

FIG. 19 is a diagram showing an example of a data converting table used for encoding and decoding;

DETAILED DESCRIPTION OF THE PREFERRED EMBODIMENT

Figure 1:
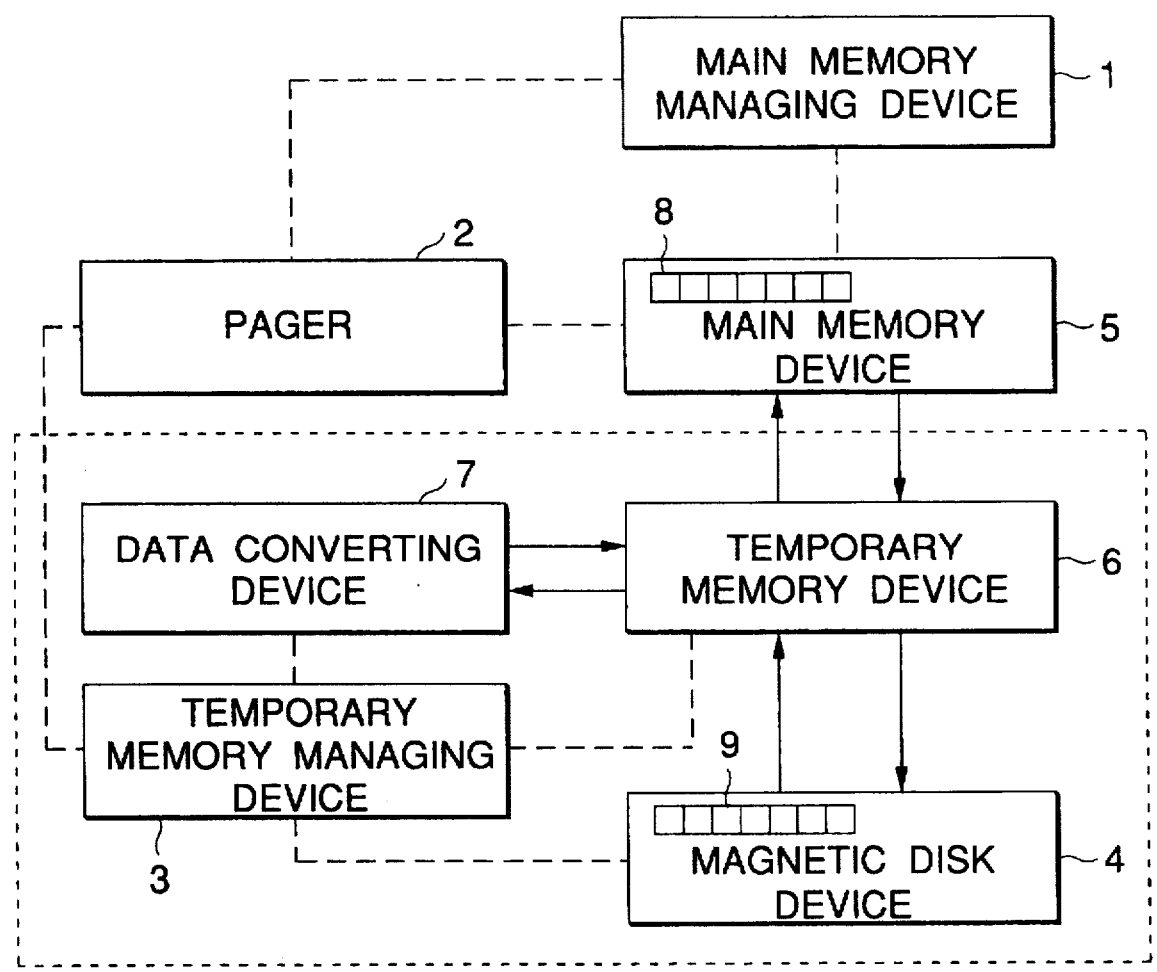
FIG. 1 is a block diagram showing an embodiment of an information storage system according to the present invention.

The arrangement of an information storage system, which is an embodiment of the present invention, is shown in FIG. 1. As shown, the information storage system is composed of a main memory managing device 1, a pager 2, a temporary memory managing device 3, a magnetic disk unit 4, a main memory device 5, a temporary memory device 6, and a data converting device 7. Solid lines with arrow heads indicate data transfer among the units. Broken lines indicate signal flows of signals for data control. In this embodiment, the information storage system is applied to a virtual memory system. In association with the page-in or page-out process that is carried out between the temporary memory device 6 and the main memory device 5, the data converting device 7 carries out a given data processing, and data is transferred between the magnetic disk unit 4 and the temporary memory device 6. The main memory managing device 1 manages the main memory device 5, and outputs commands, such as a page-in command and a page-out command, to the pager 2. The pager 2 exchanges control information with the main memory device 5 and the temporary memory managing device 3 according to information of data transfer, thereby controlling data transfer between the main memory device 5 and the temporary memory device 6.

When receiving a page-in command or a page-out command from the pager 2, the temporary memory managing device 3 causes data transfer between the main memory device 5 and the temporary memory device 6, and issues a command for converting the data that is stored in the temporary memory device 6 to the data converting device 7, thereby causing data transfer between the temporary memory device 6 and the magnetic disk unit 4. The data converting device 7 converts the data that is in the temporary memory device 6 according to a predetermined data conversion procedure, and stores the converted data into the temporary memory device 6. The data conversion procedure is prepared on the basis of information on the data conversion.

In this embodiment, the information storage system uses the temporary memory device 6. Alternatively, data may be transferred directly between the magnetic disk unit 4 and the main memory device 5, not using the temporary memory device 6 inserted therebetween. The temporary memory device 6 may be a specific memory area of the magnetic disk 4, a memory in the data converting device 7, or a memory area other than the memory area used for paging in the main memory device 5. The information storage system may be constructed to have a plural number of temporary memory devices 6. That is, a plural number of temporary memory devices 6 may be used. In other words, a hierarchical storage may be used.

In this embodiment, the result of data conversion by the data converting device 7 is stored in the temporary memory device 6. If required, it may be stored into the main memory device 5 or the magnetic disk unit 4. In the information storage system using a plural number of temporary memory devices 6, the data converting device 7 may store the data before it is converted (referred to as "before-conversion data") into a temporary memory device 6 and the data after it is converted (referred to as "after-conversion data") into another temporary memory device 6. In the information storage system not using the temporary memory device 6, data from the main memory device 5 is converted, and the converted data is directly transferred to the magnetic disk unit 4. Data from the magnetic disk unit 4 is converted and the converted data is directly transferred to the main memory device 5.

The term "before-conversion data" means the data written into data blocks in the magnetic disk unit 4, and the "after-conversion data" means the data resulting from the conversion of the before-conversion data by the data converting device 7. In a data conversion system in which a first data converting method and a second data converting method (based on the reverse data conversion procedure of the first data converting method) are used for the data converting device 7, the data resulting from the data conversion of the before-conversion data by the first data converting method may be converted into the original data or the before-conversion data again by the second data converting method. Additionally, another data conversion system may be used in which the data resulting from the data conversion of the before-conversion data by the second data converting method is different from the before-conversion data. Yet another data conversion system may be used in which a single data conversion method is used and data is converted bidirectionally. A further data conversion system may be used in which a plural number of data conversion methods are selectively used (as will be described later). As a matter of course, the temporary memory managing device 3 may select such a mode that the before-conversion data is the same as the after-conversion data, viz., no data conversion is performed by the data converting device 7. The magnetic disk unit 4 may be replaced by any or a combination of an optical disk, a magneto-optical disk, a floppy disk, a silicon disk based on semiconductor memories, and a random access tape memory.

In the arrangement of this embodiment, data conversion is performed at the time of data transfer, such as the page-in and the page-out, in the virtual memory system. It is evident that the present invention is applicable to the data transfer between the main memory device and the auxiliary memory device in a memory system other than the virtual memory system. For example, the present invention is applicable to the block transfer from a magnetic disk to the main memory device.

In the arrangement shown in FIG. 1, a portion including the temporary memory managing device 3, the magnetic disk unit 4, and the data converting device 7 or a portion including the former portion and the temporary memory device 6 may be constructed as a single auxiliary memory device. Where so done, a system with a data converting device can easily be constructed on the basis of an already installed, normal computer system not having the data converting device 7 by externally coupling the auxiliary memory device with the computer system.

The arrangement of the information storage system shown in FIG. 1 will be described in detail.

After knowing a memory access by a data processor, the main memory managing device 1 converts logical addresses to physical addresses, senses an empty page (not containing data) in the main memory device 5, determines a page to be paged in, manages an empty page in the main memory device 5, manages a page table for managing physical addresses corresponding to logical addresses, virtual block identifiers, and updating marks, and issues a page command. The term "virtual block identifier" indicates a virtual block of the after-conversion data in the temporary memory device 6. When the empty pages decreases to below a preset quantity, the main memory managing device 1 issues a page-out command to the pager 2.

The page table consists of the page number of a logical address space of a specific page, the page number of a physical address space thereof, and virtual block identifiers. When a page that received a data write access appears, an updating mark is set in the entry of a page table of the page. In the present embodiment, the main memory managing device 1 manages the page table. However, the pager 2 may manage the same, in place of the main memory managing device 1. The pager 2 may refer to and update the page table.

The pager 2 receives a page-in command of a specified page from the main memory managing device 1. In response to the command, the pager 2 instructs the data converting device 7 to send the page data (determined by a virtual block identifier of the specified page) from the temporary memory managing device 3 to the main memory device 5.

When receiving a page-in command, the pager 2 retrieves the main memory device 5 for a virtual block identifier associated with a page number of a logical address space of an empty page in the main memory device 5. Thereafter, the pager 2 issues a page-in transfer command to the temporary memory managing device 3 and the main memory device 5 so that page data to fill out the empty page is transferred from the temporary memory device 6 to the main memory device 5. By the transfer of the page data, data is located in the empty page in the main memory device 5, and then it updates the entry of the corresponding page table.

Upon receipt of a page-out command from the main memory managing device 1, the pager 2 releases the page of the main memory device 5 till the empty page increases above a preset quantity. Before releasing the page, the pager 2 checks if an updating mark is present in the entry of the page table of the corresponding page. If the updating mark is present, the pager 2 issues to the temporary memory managing device 3 and the main memory device 5 a page-out transfer command for causing the transfer of data from the main memory device 5 to the temporary memory device 6. This is done for saving the page of the main memory device 5 into the temporary memory device 6.

The temporary memory managing device 3 determines a page to be paged out from the temporary memory device 6 to the magnetic disk unit 4, manages an empty page in the temporary memory device 6, manages a temporary memory managing table for managing block identifiers, virtual block identifiers, and updating marks that are for each page of the temporary memory device 6. Here, the term "identifier" means an identifier attached to a disk block of the magnetic disk unit. The temporary memory managing device requests the data converting device 7 to convert the data of the temporary memory device 6. Additionally, the temporary memory managing device specifies a block identifier and issues read and write commands for data blocks to the magnetic disk unit 4, thereby causing the transfer of block data between the temporary memory device 6 and the magnetic disk unit 4.

The magnetic disk unit 4 for storing/managing data in units 9 of data blocks manages the correspondence between block identifiers and stored blocks on the disk. In response to a read command for the data block from the temporary memory managing device 3, the magnetic disk unit 4 outputs the data block determined by the specified block identifier. In response to a write command from the temporary memory managing device 3, the magnetic disk unit 4 stores data block.

The main memory device 5, which stores data in units 8 of data blocks, makes an access to a memory location specified by a requested address, thereby storing data into the memory location, reading out data therefrom, and erasing data stored therein. The main memory device 5 transfers the data block of the page block associated with the virtual block identifier to and from the temporary memory device 6.

The temporary memory device 6, which temporarily stores data, makes an access to a memory location specified by a requested address, thereby storing data into the memory location, reading out data therefrom, and erasing data stored therein. The temporary memory device 6 transfers the data block of the page block associated with the virtual block identifier to and from the temporary memory device 6. Similarly, the temporary memory device 6 transfers data to and from the magnetic disk unit 4.

The data converting device 7 writes data into and reads out data from the temporary memory device 6, and performs data conversion. The data converting device 7 manages the data converting table. Generally, the data conversion performed in the data converting device 7 means the operation to convert the data of m blocks into data of n blocks by a preset data conversion procedure, and to store the converted one into the temporary memory device 6. Here, m and n are each a positive integer larger than 1. m may be smaller than n. m and n may be equal to each other, as a matter of course. m and n may be determined by the data conversion procedure, independently of the contents of the data block. The same may be determined dynamically depending on the execution of the data conversion procedure and the contents of the data block. In any data block, the data block of m blocks after it is converted are not always equal to the data blocks of n blocks, for preset numbers m and n. In a case where the data of m blocks after it is converted does not reach the data of n blocks, null data corresponding to the difference between them may be supplementally added thereto.

The first data conversion procedure used for the data conversion by the data converting device 7 in the data transfer of the page-in may be reverse to the second data conversion procedure for the data conversion in the data transfer of the page-out. Specifically, these data conversion procedures may be arranged such that in the first data conversion procedure, data of m blocks is converted into data of n blocks, while in the second data conversion procedure, data of n blocks is converted into data of m blocks. However, the first and second data conversion procedures are not always arranged to have such a reversal relationship. Another data conversion procedure, not the reversal data conversion procedure, may be used. Generally, the first and second data conversion procedures used by the data converting device 7 in the page-in and page-out data transfer modes may be set up independently.

Figure 2:
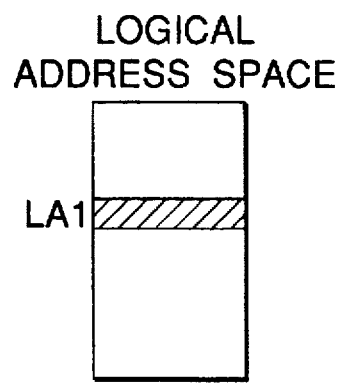
FIGS. 2(A) through 2(G) are explanatory diagrams showing examples of a page table, a temporary memory managing table, and a data converting table.
Figure 2:
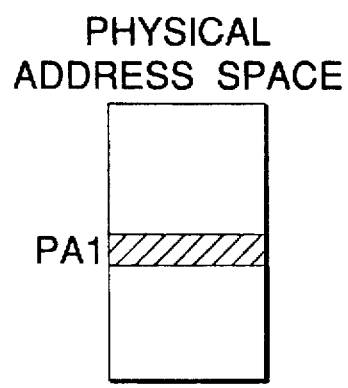
Figure 2:
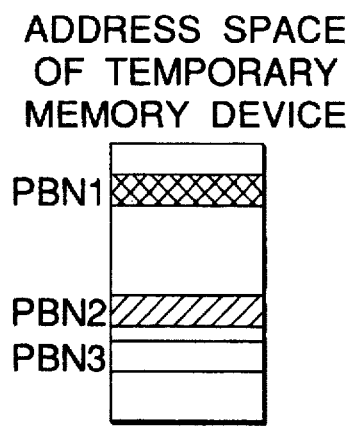
Figure 2:
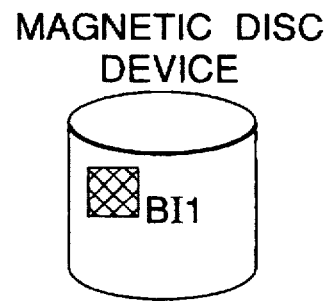

FIG. 2 is an explanatory diagram showing examples of a page table, a temporary memory managing table, and a data converting table. The tables shown in FIGS. 2(A)–2(C) are held in the main memory managing device, the temporary memory managing device and the data converting device respectively. The page table is stored in and managed by the main-storage management unit 1, for example. The items tabulated in th page table shown in FIG. 2(A) are the page number of the logical address space, the page number of the physical address space, the virtual block identifiers, and updating marks indicative of presence of updating of the corresponding page data. Another item or items may be contained in the table.

In those tables, LA1, LA2, LA3, . . . indicate the page numbers of a specific logical address space; PA1, PA2, PA3, . . . . the page numbers of a specific physical address space; and VBI1, VBI2, VBI3, . . . , virtual block identifiers. In the column of the updating mark, symbol X indicates that the page data is updated after the page-in.

In the page table shown in FIG. 2(A), the first row describes that for the logical address item LA1 and the physical address item PA1, the page number LA1 of a logical address space shown in FIG. 2(D) is mapped on the page number PA1 of a physical address space shown in FIG. 2(E). In association with the page numbers, a virtual block identifier VBI1 is assigned to the page data. In this row, symbol X is present in the column of the updating mark item. Then, it is seen that the page data is updated by a data processor.

The temporary memory managing table will be described. In the embodiment shown in FIG. 1, the temporary memory device 6 is realized as a mere page storage. The temporary memory device 6 is not a virtual storage, but may be constructed in the form of a virtual storage. The data block of the temporary memory device 6 is uniquely specified by the page block number. The temporary memory managing table is managed by the temporary memory managing device 3, for example.

The temporary memory managing table is defined by an item of the page block number, an item of the virtual block identifier or the block identifier, and an item of the updating mark. In this table, the virtual block identifier and the block identifier are both contained in one column, but those may be distinguished from each other when a sufficient large constant is added to the block identifier. The table may be expressed in the form of a table containing another item or items, as a matter of course. It is possible to employ such a paging method that an item as to whether or not the page-out to the magnetic disk unit 4 is performed, and the before-conversion data frequently used is not paged out.

PBN1, PBN2, and PBN3 indicate specific page block numbers; BI1 indicates a specific block identifier; VBI1 and VBI2, virtual block identifiers. In the column of the updating mark, symbol X indicates that after the data is transferred from the temporary memory device 6 to the magnetic disk unit 4, page data is transferred from the main memory device 5 and updated.

In the first row of the temporary memory managing table shown in FIG. 2(B), the page block number PBN1 in the address space of the temporary memory device shown in FIG. 2(F) corresponds to the block identifier BI1 on the magnetic disk shown in FIG. 2(G). In other words, before-conversion data is stored in the page block number PBN1 of the temporary memory device. In the third row of the table, a page block number PBN3 in the address space of the temporary memory device corresponds to the virtual block identifier VBI2. From the virtual block identifier VBI2 and the page table of FIG. 2(A), it is seen that the logical address LA2 corresponds to the physical address PA2. In the column of the updating mark defined by the page block number PBN3, symbol X is present. From this symbol, it is seen that this page has been transferred from the main memory device to the temporary memory device and updated.

In the data transfer between the main memory device 5 and the temporary memory device 6, a virtual block identifier is obtained from a logical address necessary for data transfer in a manner that a virtual block identifier is obtained from a logical address to be data transferred by referring to the page table, and the temporary managing table is referred to using the obtained virtual block identifier. Since a page on the main memory device 5 is obtained from the physical address in the page table, data is transferred between the page associated with the physical address in the main memory device 5 and the page associated with the page block number on the temporary memory device 6.

The data converting table will be described. The data converting table is stored and managed by the data converting device 7. The data converting table is expressed in the form of a table containing an item of the virtual block identifier, an item of the first data converting method, an item of the block identifier series of before-conversion data, and an item of virtual block identifier series of the after-conversion data (FIG. 2(C)). The table may be expressed in the form of a table containing another item or items, as a matter of course. In the table, VBI1, VBI2, VBI3, VBI4, and VBI5 indicate specific virtual block identifiers; TR1 and TR2, specific first data converting methods; RTR1 and RTR2, specific second data converting methods; and BI1, BI2, and BI3 represent specific block identifiers.

In the data converting table shown in FIG. 2(C), the first row contains the virtual block identifier VBI1, the first data converting method TR1, the second data converting method TR2, the block identifier series BI1 of before-conversion data, and the virtual block identifier series VBI1 VBI2 of the after-conversion data. It is assumed that the first data converting method is used for the data conversion method for the page-in, and the second data converting method, for the data conversion method for the page-out. On this assumption, a page with the virtual block identifier VBI1 attached thereto is generated, together with a page with the virtual block identifier VBI2 attached thereto, when the data block with the block identifier BI1 attached thereto in the magnetic disk unit 4 shown in FIG. 2(F) is converted by the first data converting method TR1. The table further describes that a page with the virtual block identifier VBI1 attached thereto, together with a page with the virtual block identifier VBI2 attached thereto, is converted into data block with the before-conversion data block identifier BI1 attached thereto by the second data conversion RTR1.

The block identifier of the before-conversion data and the virtual block identifier of after-conversion data correspond to the page block number, as seen from the temporary memory managing table shown in FIG. 2(B). In the data transfer of page-in, before-conversion data is taken out of a page associated with the block identifier in the temporary memory device 6, while referring to the temporary memory managing table in connection with the block identifier of before-conversion data. The before-conversion data taken out is converted by the first data converting method. The resultant after-conversion data is stored in a page associated with the page block number in the temporary memory device 6, while referring to the temporary memory managing table in connection with the virtual block identifier of after-conversion data. To return the after-conversion data to the before-conversion data by the data converting device 7, the after-conversion data is read out of a page associated with the virtual block identifier in the temporary memory device 6 in connection with the virtual block identifier of after-conversion data. The after-conversion data read out is converted by the second data converting method, thereby obtaining the before-conversion data. The before-conversion data thus obtained is stored into a page associated with the page block number in the temporary memory device 6, while referring to the temporary memory managing table in connection with the block identifier of before-conversion data. These tables may be presented in a separate form. Alternately, these tables may be gathered into a single table. The devices for managing these tables may be appropriately selected. For example, the page table may be managed by the pager 2, and the data converting table, by the temporary memory managing device 3.

Figure 3:
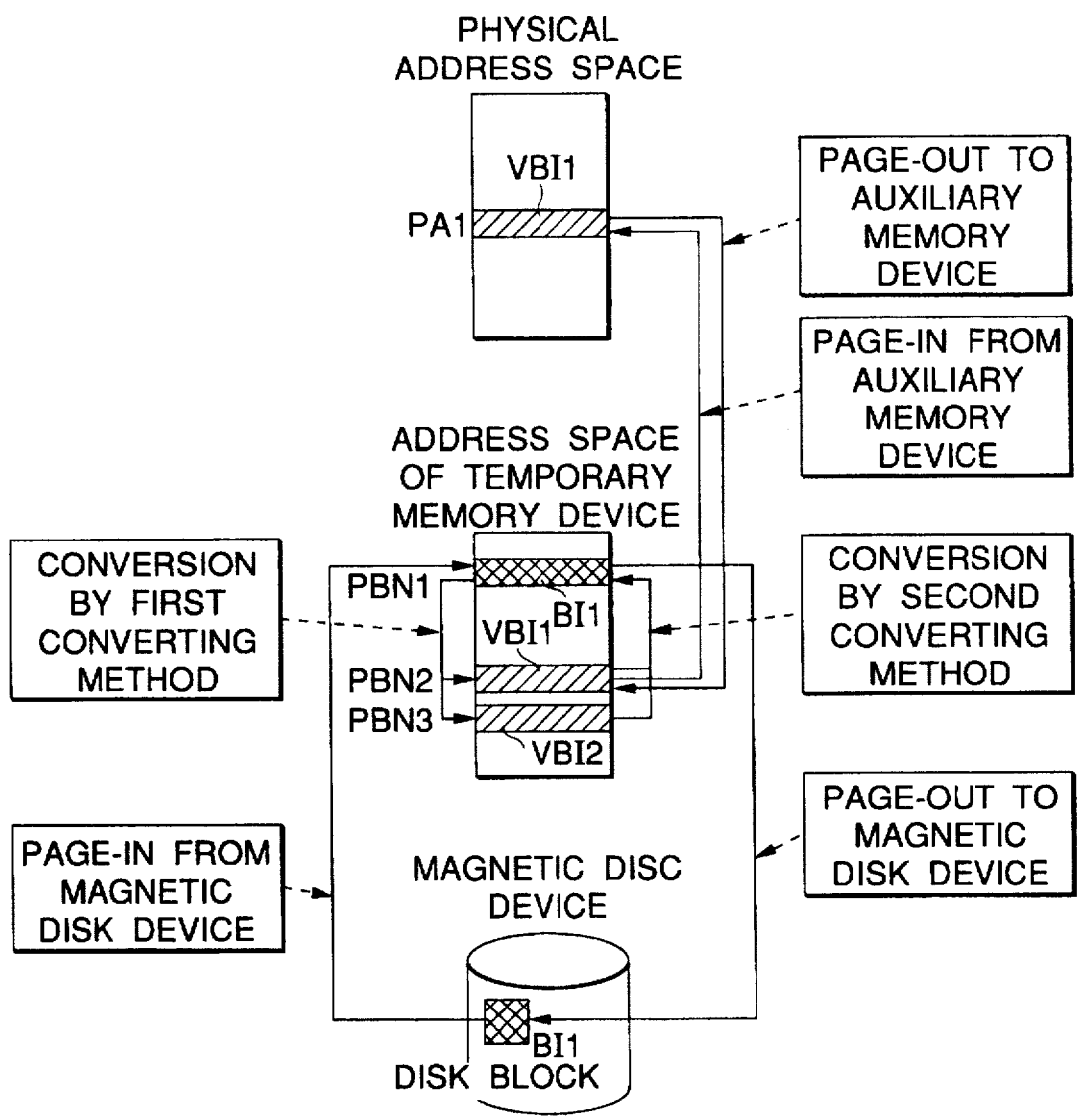
FIG. 3 is an explanatory diagram showing the operation of the embodiment of the information storage system according to the present invention.

FIG. 3 is an explanatory diagram showing the operation of the embodiment of the information storage system according to the present invention. FIGS. 4 to 9 are flowcharts showing the operations of the information storage system when the information storage system operates in a page-out mode. FIGS. 10 to 14 are flowcharts showing the operations of the information storage system when the information storage system operates in a page-in mode. In the description to follow, it is assumed that first and second data conversion procedures are employed in the data converting device 7. The first data conversion procedure converts an m number of data blocks into an n number of data blocks, and is expressed as F–mn. The second data conversion procedure converts an n number of data blocks into an m number of data blocks, and is expressed as G__nm. A series of an m number of data blocks of before-conversion data is expressed as M=<M__1, M__2, . . . , M__m>. A series of an n number of data blocks of before-conversion data, which is generated by converting the data block series M by the first data conversion procedure F__mn, is expressed as N=<N__1, N__2, . . . , N__n>. Further, it is defined that the second data conversion procedure G__nm is the reverse data conversion procedure of the first data conversion procedure F__mn, which outputs the input data to the first data conversion procedure F__mn when it receives the output data of the first data conversion procedure F__mn.

The process of the page-out will be described with reference to FIGS. 1 and 3, and FIGS. 4 through 9 showing flowcharts. FIG. 4 is a flowchart showing an example of operation flow of the main memory managing device 1 in a page-out mode. In step S101, the main memory managing device 1 monitors an empty page of the main memory device 5 to check if the quantity of the empty page decreases to below a first preset quantity. If it is below a first preset quantity, the main memory managing device 1 issues a page-out command to the pager 2 in step S102.

Figure 5:
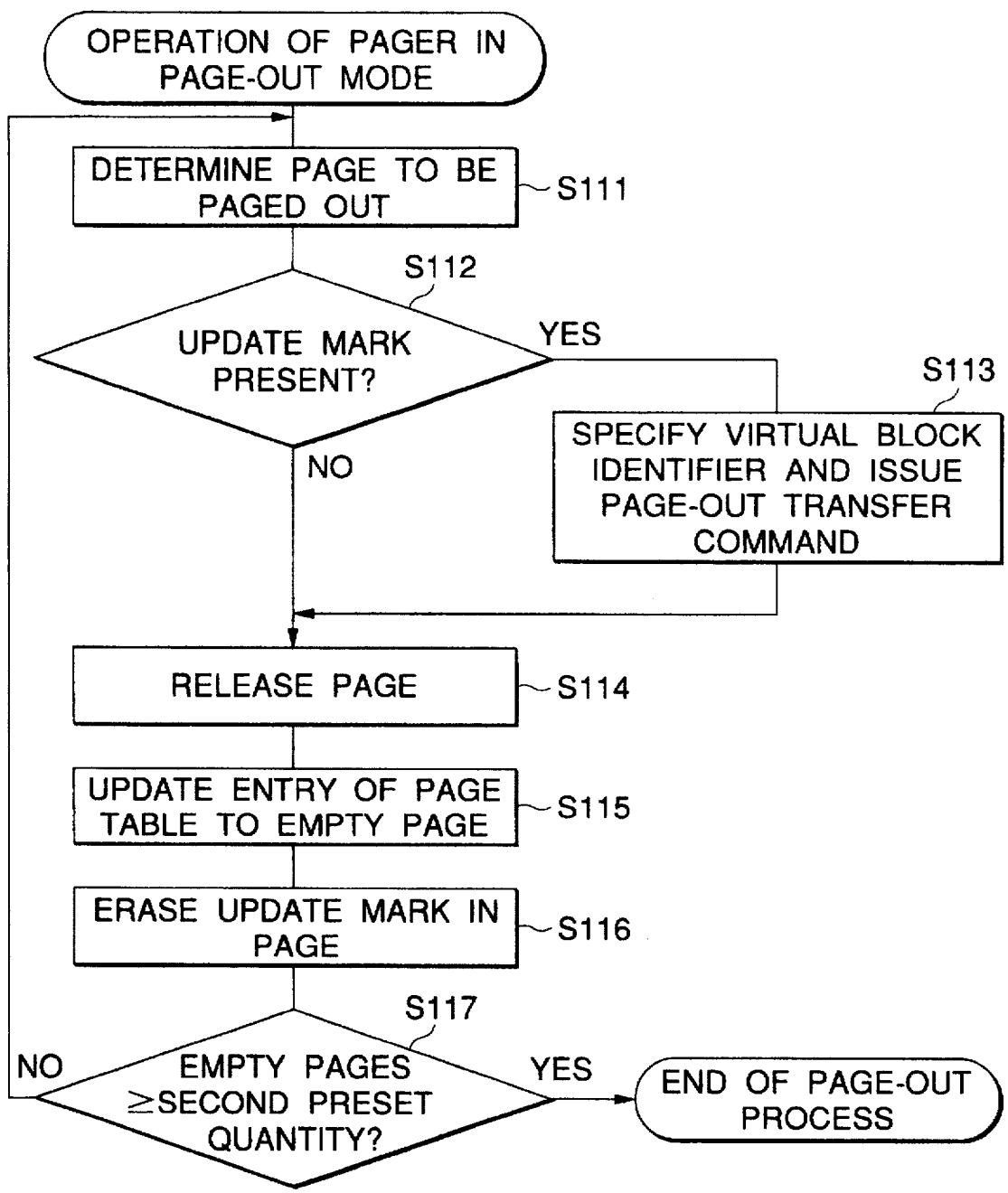
FIG. 5 is a flowchart showing an example of the operation flow of the pager in a page-out mode.

FIG. 5 is a flowchart showing an example of the operation flow of the pager 2 in a page-out mode. When receiving a page-out command from the main memory managing device 1, the pager 2 retrieves a page table retained in the main memory managing device 1 and determines a page to be paged out in step S111. The method to determine the page to be paged out may be any of the corresponding ones employed in a conventional virtual storage system. For example, an LRU replacement method may be used. In this method, the page that has not been referred to and updated for the longest time is paged out most preferentially. A minimum cost replacement method may be used. In this method, a procedure to estimate the cost for the page-out is executed by the data converting device 7, allowing for the case where the cost for the page-out depends on the data conversion procedure and the contents of page data. The page requiring a minimum cost for the page-out that is selected by the estimation procedure is paged out most preferentially. Another minimum cost replacement method may be used. In this method, not only the cost for the page-out but also the cost for paging in the page after paged out is considered for the minimum cost estimation.

In step S112, the pager 2 retrieves the page table to check as to whether or not an update mark is contained in the page to be paged out. The updating mark is a mark to indicate whether or not the paged-in page has been updated by a write access. If the update mark is not present, the pager 2 releases the page in step S114, and updates the page table so as to set an empty page to the entry in the page table in step S115.

If the update mark is present in the page to be paged out, the pager 2 specifies a virtual block identifier of that page, and issues a page-out transfer command to the main memory device 5 and the temporary memory managing device 3 (step S113). In response to the page-out transfer command, data is transferred from the main memory device 5 to the temporary memory device 6. This data transfer procedure corresponds to a route (4) in FIG. 3. After the data transfer ends, the pager 2 releases the page in step S114, and updates the page table so as to set an empty page to the entry in the page table in step S115. Further, in step S116, the pager 2 erases the update mark of that page.

In step S117, the pager 2 checks if the empty page in the main memory device 5 exceeds a second preset quantity. If it does not yet exceeds the second preset quantity, the pager 2 continues the page-out process till it reaches the second preset quantity. Preferably, the second preset quantity is sufficiently larger than the first preset quantity in order to avoid reduction of the whole processing efficiency as the result of frequent occurrence of page releasing procedures.

FIG. 6 is a flowchart showing an example of the operation flow of the main memory device 5 in a page-out mode.

When receiving a virtual block identifier of the page and a page-out transfer command from the pager 2, the main memory device 5 retrieves the page table for a physical address using the virtual block identifier, and transfers the page specified by the obtained physical address to the temporary memory device 6.

Figure 7:
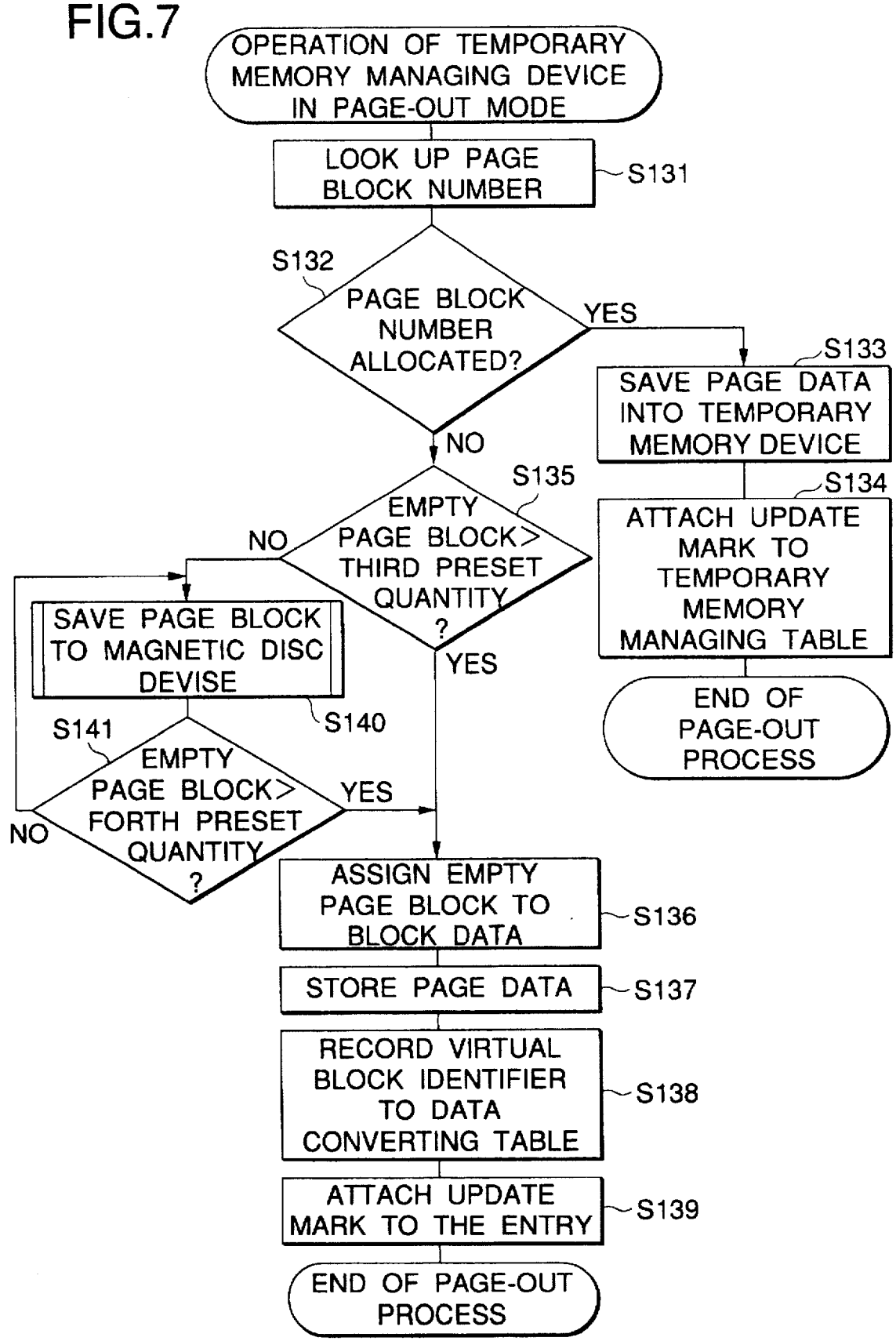
FIG. 7 is a flowchart showing an example of the operation flow of the temporary memory managing device in a page-out mode.

FIG. 7 is a flowchart showing an example of the operation flow of the temporary memory managing device 3 in a page-out mode. When receiving a specified page-out transfer command from the pager 2, the temporary memory managing device 3 retrieves the contents of the temporary memory managing table while using a virtual block identifier which also receives from the pager 2, thereby to look up the page block number of the temporary memory device 6, which corresponds to the specified virtual block identifier from the pager 2 (step S131).

In step S132, the temporary memory managing device 3 checks if the page block number of the temporary memory device 6 is allocated to the temporary memory managing table in association with the specified virtual block identifier. If it is assigned, in step S133 the temporary memory managing device 3 stores the page data transferred from the main memory device 5 into the page block of the temporary memory device 6. In the next step S134, the temporary memory managing device 3 sets an update mark in the related entry of the temporary memory managing table, and ends the page-out process.

If the page block number of the temporary memory device 6 is not allocated in step S132, the temporary memory managing device 3 secures a page on the temporary memory device 6, and stores the data transferred from the main memory device 5 in that page, through the process steps of a step S135 and the subsequent ones. In step S135, the temporary memory managing device 3 checks if the empty page block of the temporary memory device 6 exceeds a third preset quantity. If it exceeds the third preset quantity, the temporary memory managing device 3 assigns the empty page block to the block data to be paged out, in step S136. In the next step S137, the temporary memory managing device 3 stores the page data into the page block of the temporary memory device 6. In step S138, the temporary memory managing device 3 records a virtual block identifier into the entry of the related page block number in the temporary memory managing table, thus updating the data converting table. In step S139, the temporary memory managing device 3 attaches an update mark to the entry, and completes the page-out process.

If the empty page block of the temporary memory device 6 is below the third preset quantity in step S135, the temporary memory managing device 3 saves a specific page block received from the temporary memory device 6 into the magnetic disk unit 4 (step S140). In step S141, the temporary memory managing device 3 checks if the empty page block of the main memory device 5 exceeds a fourth preset quantity. If it does not reach the fourth preset quantity, the temporary memory managing device 3 continues the saving process to the magnetic disk unit 4 (step S140) till the empty page block exceeds the fourth preset quantity. If it exceeds the fourth preset quantity, the temporary memory managing device 3 executes the storing process of the transfer data from the main memory device 5 that starts from the step S136.

Figure 8:
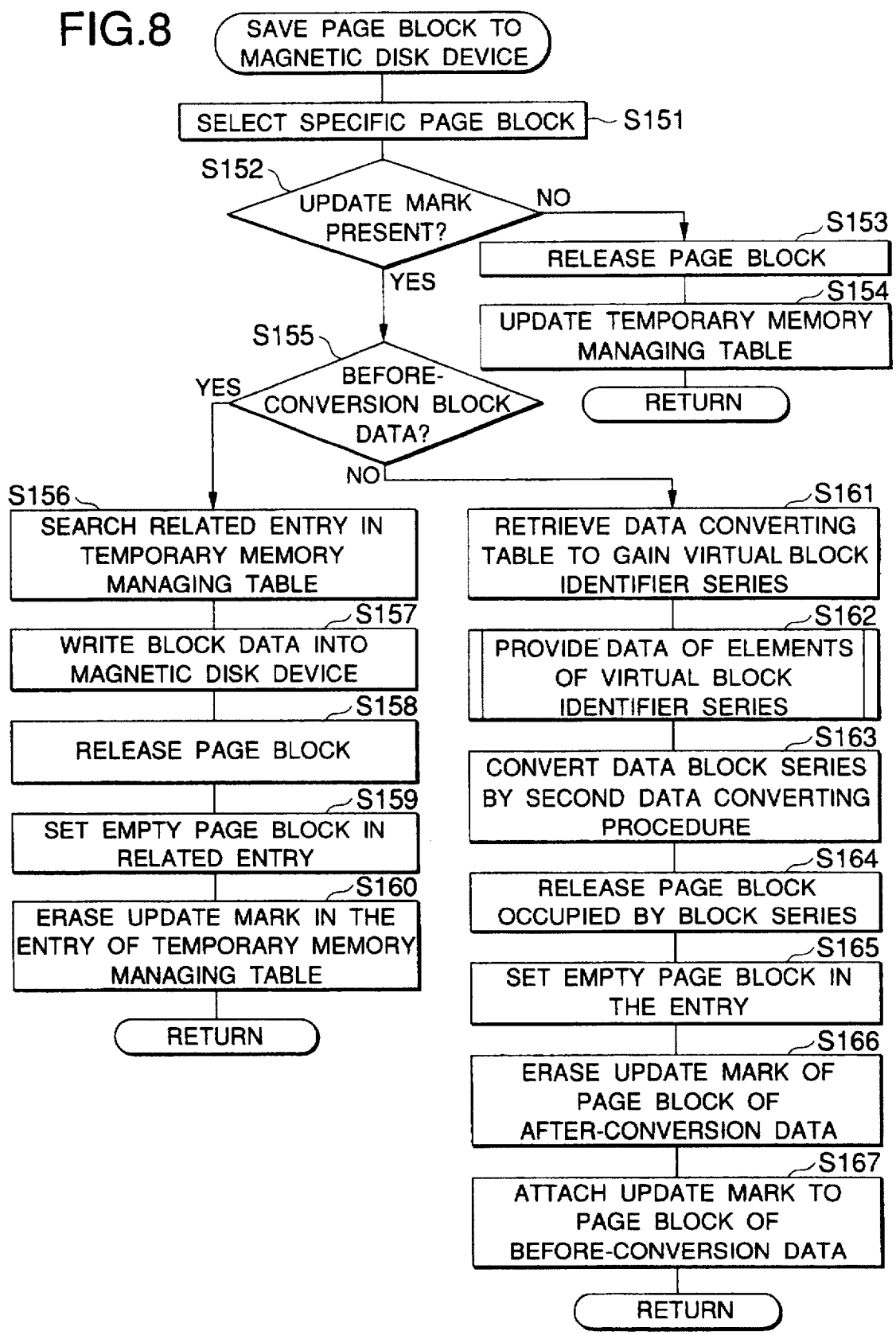
FIG. 8 is a flowchart showing an example of the operation of saving data from the temporary memory device to the magnetic disk unit in a page-out mode.

FIG. 8 is a flowchart showing the operation of saving data from the temporary memory device 6 to the magnetic disk unit 4 in a page-out mode. The temporary memory managing device 3, in step S151, selects a specific page block of the temporary memory device 6 from the temporary memory managing table. The method for selecting the specific page block may be a known page management method or a block management method for a cache memory. For example, an LRU replacement method may be used. In this method, the page that has not been referred to and updated for the longest time is most preferentially selected for a page block not yet used. A minimum cost replacement method may be used. In this method, a procedure to estimate the cost for writing data into the magnetic disk unit 4 and the cost for the data conversion procedure is executed, and a page block allowing itself to be referred to at the minimum cost in the next reference is most preferentially selected for a page block not yet used, on the basis of the comparison of the estimated costs. Another replacement method may be used. In this method, a page block capable of restoring the block data for the shortest time in the next page block access is most preferentially selected for a page block not yet used.

The temporary memory managing device 3, in as step S152, checks if the update mark is attached to the selected specific page block. If the update mark is not attached, the temporary memory managing device 3, in step S153, determines that the entry of the temporary memory managing table is an empty page block, releases the page block, and in step S154, updates the temporary memory managing table.

Further, the page block may be released in the following manners. When the selected page block is the element M_k of the before-conversion data block series M and no update mark is attached to any of the data blocks M_1, ..., M_m, the temporary memory managing device 3 releases the page block including the data block M_k. When the update mark is attached to one or more of the data blocks M_1, ..., M_m, the temporary memory managing device 3 saves the data block series M and then the page block including data block M_k is released by the procedure of releasing the before-conversion data block with the update mark (executed in steps S156 to S160 to be described later). In either case, the data block series M may be released, instead of the data block M_k. A similar process is applicable to a case where the selected page block is the element N_k of the after-conversion data block series N.

When the update mark is attached to the selected specific page block, the temporary memory managing device 3 saves the block data of the selected specific page block, and determines that the related entry of the temporary memory managing table is an empty page block, and releases the page block, by the process of a step S155 and the subsequent ones. The process of saving the block data of the selected specific page block when the page block is not yet converted is different from that when the page block has been converted. This process will be described for the respective cases before and after the page block is converted.

In step S155, the temporary memory managing device 3 checks if the selected specific page block contains the block data not yet converted (referred to as "before-conversion block data") or the block data having been converted (referred to as "after-conversion block data"), by looking at the contents of the temporary memory managing table. If the selected specific page block is before-conversion block data, the temporary memory managing device 3 operates in the following. In step S156, it retrieves the related entry in the temporary memory managing table. In step S157, it specifies a block identifier in the entry, and writes the block data of the related data block into the magnetic disk unit 4. This operation is indicated by a route (8) in FIG. 3. Then, the temporary memory managing device 3 releases the page block (step S158), sets an empty page block in the related entry of the temporary memory managing table (step S159), and erases the update mark in the entry (step S160).

This case corresponds to a case where the selected specific page block is the before-conversion data block M_k (where k is any of integers 1 to m). In the above-mentioned instance, one page is released simply. In a case where the temporary memory managing device 3 retrieves the data converting table and finds that data blocks M_i (i indicates all of integers 1 to m), which constitute the before-conversion data block series M including the data block M_k, are contained in the page block in the temporary memory device 6, the temporary memory managing device 3 writes the block data into the magnetic disk unit 4 according to the update mark in the temporary memory managing table, and releases these pages enbloc.

If in step S155, the temporary memory managing device 3 determines that the selected specific page block contains after-conversion block data, it carries out the data conversion process according to the data conversion procedure, and carries out the process of writing data into the magnetic disk unit 4 (a step S161 and the subsequent ones). Description will be given using a case where the selected specific page block is after-conversion data block N_k (k : any of integers 1 to n).

In step S161, the temporary memory managing device 3 retrieves the data converting table, and looks up a virtual block identifier series of after-conversion data while referring to the entry of the virtual block identifier corresponding to the data block N_k. The virtual block identifier series corresponding to the data block series N including the data block $N_{13}$ k is stored in the item of the virtual block identifier series of the after-conversion data. In step S162, for the virtual block identifiers (associated with data blocks N_i (i indicates all of integers from 1 to n except k)) as elements in the virtual block identifier series corresponding to data block series N, the temporary memory managing device 3 specifies a virtual block identifier to provide data, and in step S163 converts the data block series N according to the second data conversion procedure. This operation corresponds to a route (5) in FIG. 3. The temporary memory managing device 3 releases the page occupied by the data block series N (step S164), sets an empty page block in the related entry of the data converting table (step S165), and erases the update mark in the entry (step S166). Since the data block series M of the before-conversion data is updated by the data conversion, the update mark is attached to the related entry of the data converting table (step S167).

Figure 9:
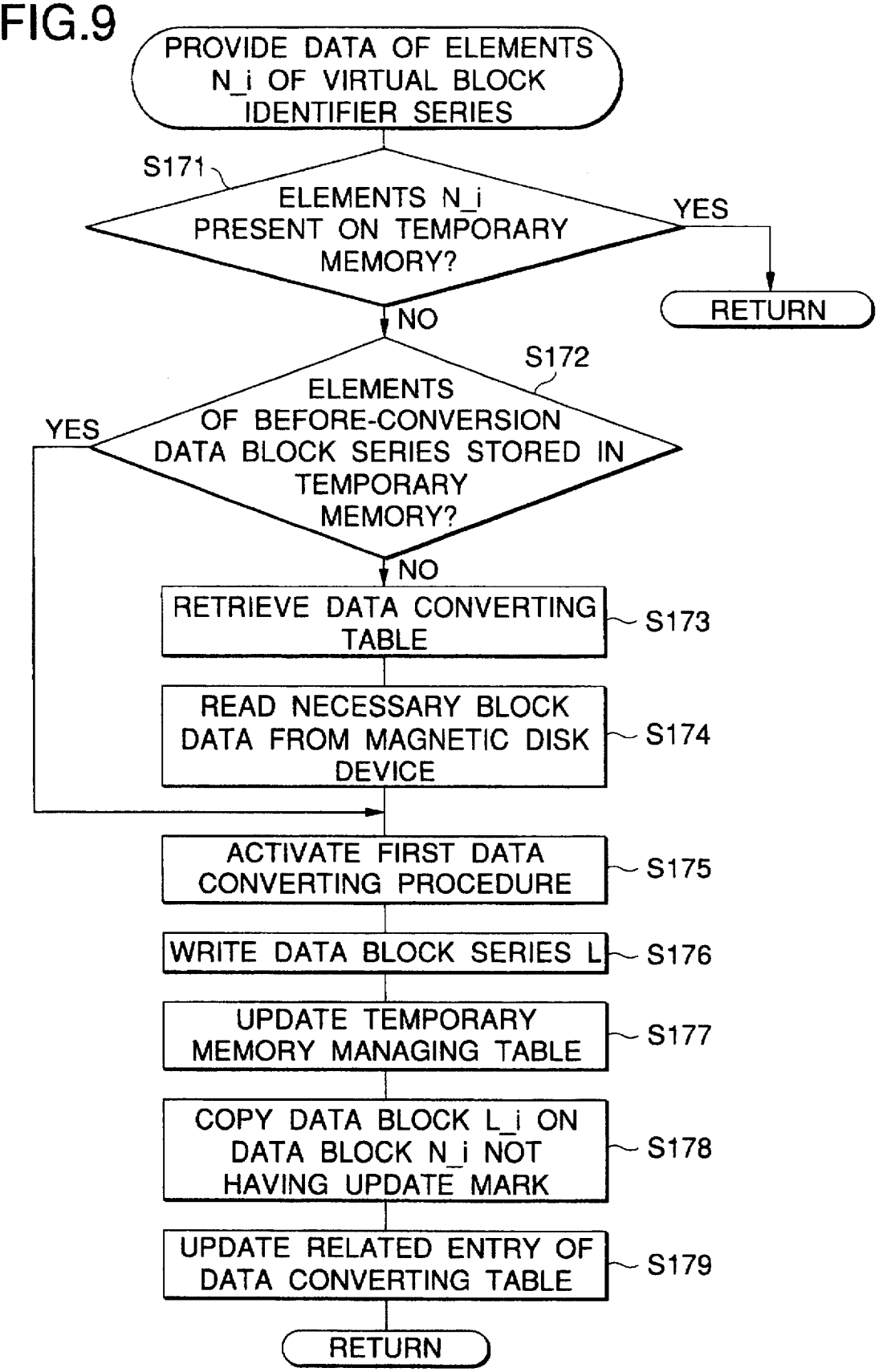
FIG. 9 is a flowchart showing an example of the operation flow of providing the after-conversion data block series in a page-out mode.

FIG. 9 is a flowchart showing an example of the operation flow of providing the after-conversion data block series in a page-out mode. This process is executed in step S162 in FIG. 8. In step S171, the temporary memory managing device 3 checks whether or not all of the elements in the after-conversion data block series N except the data blocks N_k are present on the temporary memory device 6. If all of the elements are present, this process returns to the process of FIG. 8, since there is no data block series to be provided, the data blocks N_i are not present on the temporary memory device 6 in step S171, the temporary memory managing device 3 checks, in step S172, whether or not all of the elements M_1, M_2, . . . , M_m of the before-conversion data block series M are stored in the temporary memory device 6. If the before-conversion data block series M are stored in the temporary memory device 6, the temporary memory managing device 3 activates the first data conversion procedure F_mn (step S175), and writes a data block series L=<L_1, L_2, . . . , L_n>, which is generated when the data block series M is converted by the first data conversion procedure F_mn, into the temporary memory area of the temporary memory device 6 (step S176). Further, the temporary memory managing table is updated (step S177), the data block L_i is copied on the data block N_i not having the update mark (step S178). If the data block N_i is not present in the temporary memory device 6, the temporary memory managing table may be updated with the data block L_i and the data block N_i.

Alternatively, the page block N_i with the update mark is set to a write-inhibition state or protected against the writing operation, for the purpose of memory protection. Thereafter, the data block series M is written over a series of data blocks N=<N_1, N_2, . . . , N_n>, which is generated when the data block series M is converted by the first data conversion procedure F_mn.

If the elements M_1, M_2, . . . , M_m of the before-conversion data block series M are not stored in the temporary memory device 6 in step S172, the temporary memory managing device 3 retrieves the data converting table (step S173), and repeats the process of transferring necessary block data from the magnetic disk unit 4 to the temporary memory device 6 (step S174), thereby providing the data blocks M_1, M_2, . . . , M_m. This operation corresponds to a route (1) in FIG. 3. After all of the data block series M are provided, the temporary memory managing device 3 executes the procedure of a step S175 and the subsequent ones, which is subsequent to the data conversion by the first data conversion procedure F_mn.

Figure 10:
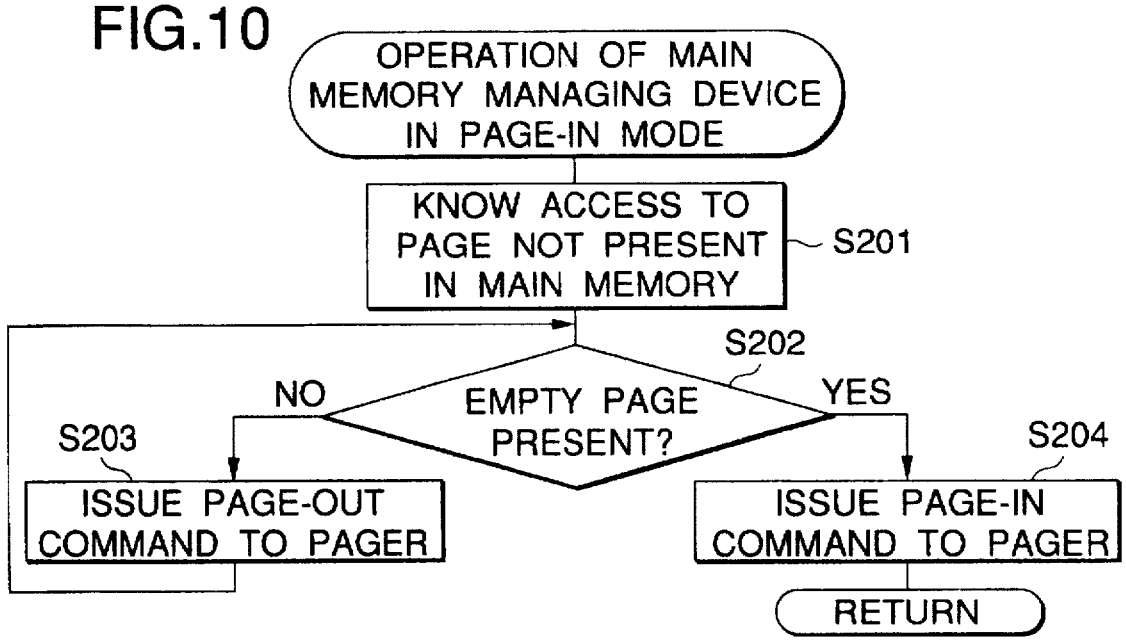
FIG. 10 is a flowchart showing an example of operation flow of the main memory managing device in a page-in mode.

The process of a page-in will be described with reference to FIGS. 1 and 3, and FIGS. 10 through 14 showing flowcharts. FIG. 10 is a flowchart showing an example of operation flow of the main memory managing device 1 in a page-in mode. The main memory managing device 1 knows an access to a page not present in the main memory device 5 (step S201), and checks whether or not the empty page is present in the main memory device 5 (step S202). If the empty page is absent, the main memory managing device 1 issues a page-out command to the pager 2, thereby securing an empty page. Thereafter, the main memory managing device 1 returns to the step S202. If an empty page is present (step S202), the main memory managing device 1 issues a page-in command to the pager 2.

The main memory managing device 1 can know the access to the page not present in the main memory device 5 by the conventional hardware interrupt, such as a missing page fault. The main memory managing device 1 can know the presence or absence of the empty page by the empty page management mechanism of the main memory managing device per se.

Figure 11:
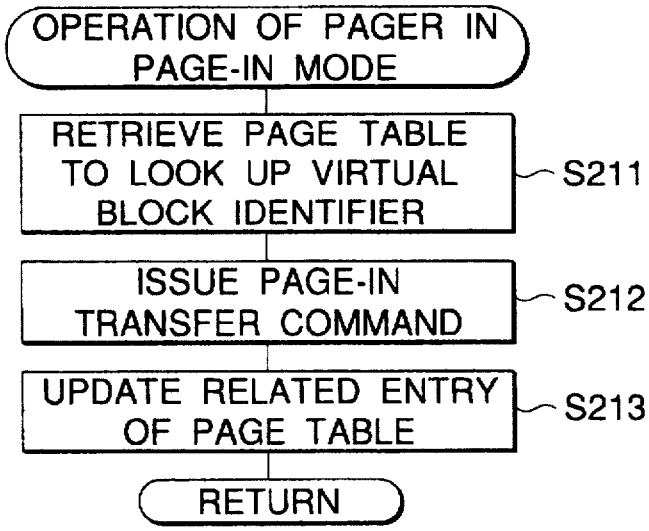
FIG. 11 is a flowchart showing an example of the operation flow of the pager in a page-out mode.

FIG. 11 is a flowchart showing an example of the operation flow of the pager 2 in a page-out mode. When receiving a page-in command from the main memory managing device 1, the pager 2 retrieves the page table to look up a virtual block identifier of a page to be paged in (step S211). The pager 2 specifies the virtual block identifier of the page and issues a page-in transfer command to the main memory device 5 and the temporary memory managing device 3 (step S212). As a result, page data is transferred from the temporary memory device 6 to the main memory device 5. This operation corresponds to a route (3) in FIG. 3. When the page data is transferred to the main memory device 5, the pager 2 updates the related entry of the page table (step S213), and ends the process of page-in.

Figure 12:
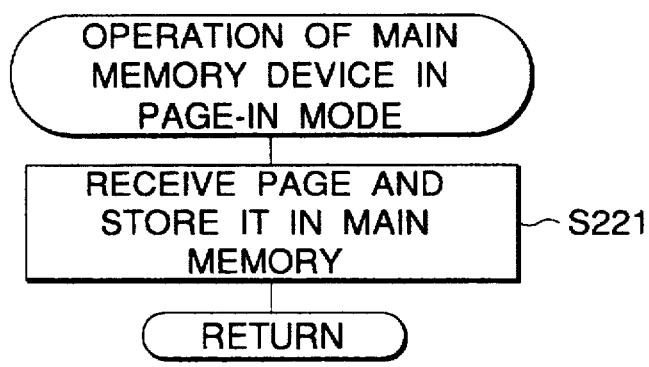
FIG. 12 is a flowchart showing an example of the operation flow of the main memory device in a page-in mode.

FIG. 12 is a flowchart showing an example of the operation flow of the main memory device 5 in a page-in mode. In step S221, the main memory device 5 receives a virtual block identifier of the page and a page-in transfer command from the pager 2, and stores the page data received from the temporary memory device 6 into a preset memory location of the main memory device per se.

Figure 13:
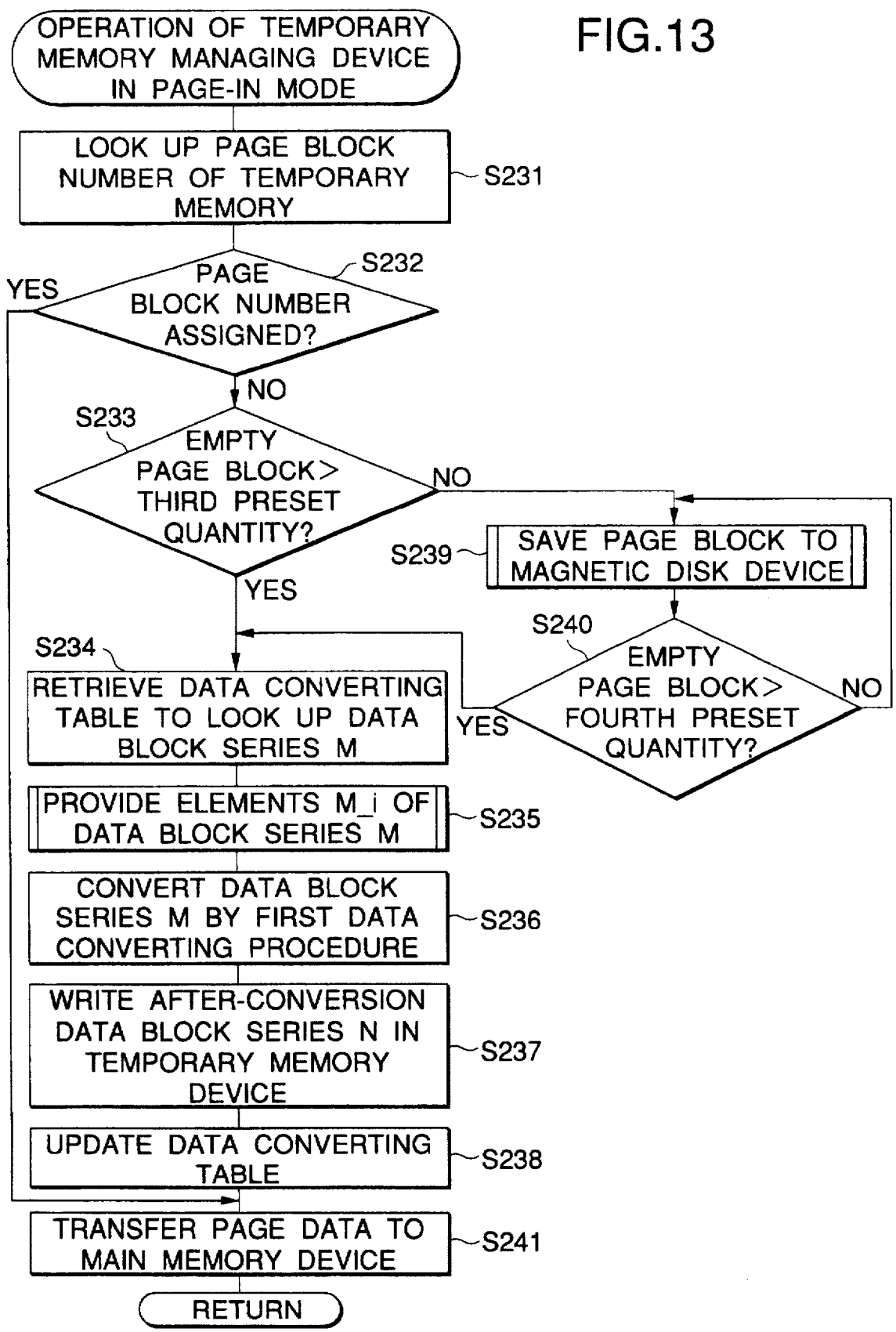
FIG. 13 is a flowchart showing an example of the operation flow of the temporary memory managing device in a page-in mode.
Figure 14:
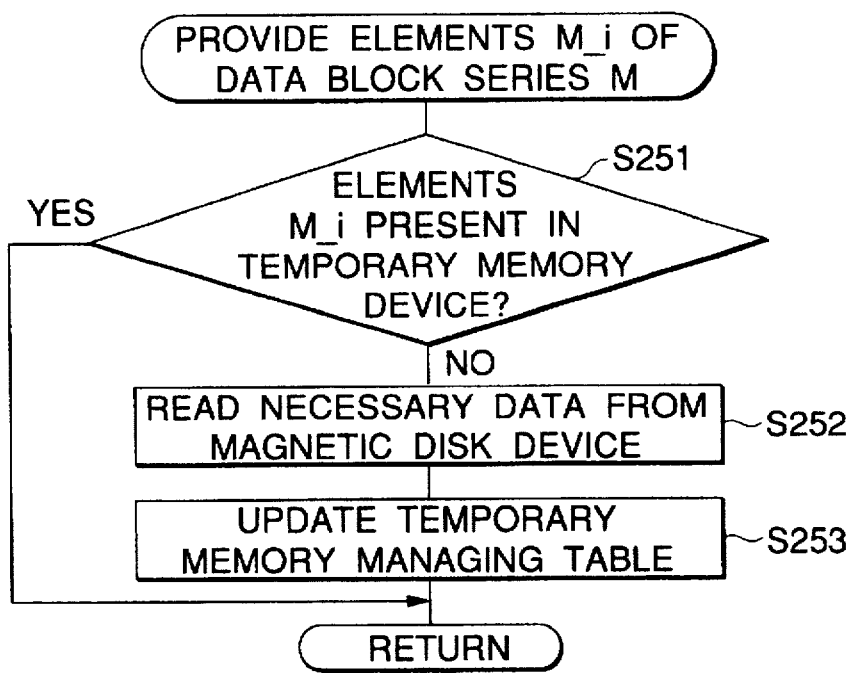
FIG. 14 is a flowchart showing an example of the operation flow of providing data for each element of a block identifier series in a page-in mode.

FIG. 13 is a flowchart showing an example of the operation flow of the temporary memory managing device 3 in a page-in mode. FIG. 14 is a flowchart showing an example of the operation flow of providing data for each element of a block identifier series in a page-in mode. When receiving a virtual block identifier of a page to be transferred and a page-in transfer command from the pager 2, the temporary memory managing device 3 retrieves the temporary memory managing table to look up a page block number of the temporary memory device 6, which corresponds to the virtual block identifier (step S231).

The temporary memory managing device 3 checks if the page block number of the temporary memory device 6 is assigned to the virtual block identifier (step S232). If it is assigned, the temporary memory managing device 3 transfers the page data that is stored in the page block to the main memory device 5. In this instance, the page block that stores the page data stored in the page block is not released. However, if required, it may be released. To release it, the related portion in the temporary memory managing table is updated to contain a page block not yet used.

If the page block number of the temporary memory device 6 is assigned to the virtual block identifier (step S232), the page data before it is converted is provided and the page data generated by converting the before-conversion page data by the first data conversion procedure is provided.

In step S233, the temporary memory managing device 3 checks if the empty page block in the temporary memory device 6 exceeds a first preset quantity. If the empty page block exceeds the first preset quantity, the temporary memory managing device 3, in step S234, retrieves the data converting table to look up a block identifier of the before-conversion page data, which corresponds to the virtual block identifier. In step S235, the temporary memory managing device 3 provides data for the elements of the block identifier series. It provides the elements M_i of the data block series M, for example. This operation corresponds to a route (1) in FIG. 3.

After the data block series M is provided, the temporary memory managing device 3 converts the data block series M by the first data conversion procedure F_mn (step S236), and stores into the temporary memory device 6 the data block series N generated by converting the data block series M by the first data conversion procedure F_mn (step S237). This operation corresponds to a route (2) in FIG. 3. In step S238, the temporary memory managing device 3 updates the related portion in the data converting table. Of the data block series N generated through the first data conversion procedure F_mn, the page data associated with the specified virtual block identifier is transferred to the main memory device 5 in step S241.

The process of the step S235 for providing data for each element of the block identifier series that is carried out by the temporary memory managing device 3 will be described with reference to FIG. 14. In step S251 in FIG. 14, the temporary memory managing device 3 checks if all of the elements M_1, M\2, ..., M_m of the data block series M are present in the temporary memory device 6. If the answer is NO, viz., these elements are absent, the temporary memory managing device 3 reads necessary page data of the data block series M from the magnetic disk unit 4 by specifying a block identifier associated with the data block M_i, and stores it to the temporary memory device 6 (step S252). In the next step S253, the temporary memory managing device 3 updates the temporary memory managing table.

Returning to FIG. 13, if the empty page block of the temporary memory device 6 does not reach a third preset quantity (step S233), the temporary memory managing device 3 saves a specific page block or blocks in the temporary memory device 6 to the magnetic disk unit 4 (step S239). In step S240, the temporary memory managing device 3 judges if the empty page block of the temporary memory device 6 exceeds a fourth preset quantity. If it does not reach the preset quantity, the temporary memory managing device 3 repeats the process of saving the specific page block (step S239) till the empty page block exceeds the fourth preset quantity. This saving process resembles the process of saving the page block into the temporary memory device 6 already described referring to FIGS. 8 and 9.

When the page block is saved and the empty page block of the temporary memory device 6 exceeds the fourth preset quantity, the temporary memory managing device 3 advances to a step S234 where it executes the process of providing the before-conversion page data.

In the description thus far made, the operations of the information storage system of the present invention after the respective tables shown in FIG. 2 are formed were diskussed. When a new process is driven or a new file is opened and mapped on a memory, the respective tables are updated or new tables are formed on the basis of the process or the file. At this time, the data conversion procedure or procedures executed by the data converting device 7 may be set by the system or designated by a user.

A case where a user selects a desired data conversion procedure from among a plural number of data conversion procedures provided in the system when an opened file is mapped in the memory, will be described. In the application program, the data of the file is mapped in an array, for example, by a memory map system call after a file is opened. A typical example of the memory map system call is a map system call of Sun OS by Sun Micro Systems Inc. In the map system call, the numbers of the first and second data conversion procedures are added, in addition to the argument of a conventional memory map system call. In this case, the first and second data conversion procedures may be a data conversion process for converting the data of the disk block into the data to be transferred to the main memory device and a reverse data conversion process for converting the data of the main memory device into the data of disk block, respectively.

When a memory map system call is generated, a virtual block identifier is assigned, and the virtual block identifier and tables of the first and second data conversion procedures are transmitted to the auxiliary storage. Then, the auxiliary storage secures an entry associated with the virtual block identifier in the data converting table, and assigned to the secured entry the numbers of the first and second data conversion procedures, a series of block identifiers of before-conversion data, and a series of virtual block identifiers of after-conversion data. Either of the first and second data conversion procedures or neither of them may be designated. For the dealing with the data conversion procedure not designated, a default conversion procedure may be assigned thereto in the system or the system may be designed such that the data converting device 7 does not execute that data conversion procedure.

This example is very effective when it is applied to a case where a plural number of data conversion procedures are provided in the data converting device 7. In this case, the data conversion procedures may selectively be used in accordance with a file used by the application. The system may also be designed such that the user can expressly designate the data conversion procedure in the command level of OS. In this case, the file data can be converted through the copying of the file, for example.

The data conversion procedure provided by the user can be executed. To this end, an entry address and the length of the data conversion procedure are used as the arguments of the memory map system call when the first and second data converting methods are designated. By so doing, after the data is mapped on the memory and the page-in is instructed, the data of the length corresponding to the length of the data conversion procedure is read out of the memory location of the entry address designated by the argument and transferred to the data converting device. The data converting device executes the conversion process by using the received data conversion procedure before it converts the before-conversion data, and writes the after-conversion data into the corresponding page on the temporary memory device. Thereafter, the after-conversion data is transferred to the main memory device. The data of the data conversion procedure is transferred to the data converting device by way of the temporary memory device, but it may directly be transferred to the data converting device.

In a case where a plural number of data conversion procedures are provided in the data converting device, an intended data conversion procedure is expressly selected from among those procedures by the user or the application program. Other procedure select methods may be used for the same purpose. Some of these select methods will be described.

By executing a predetermined procedure, an intended data conversion method can be selected. In this example, the data converting device 7 the data converting device 7 contains and manages a procedure table tabulating the correspondence of the results of evaluating the procedure and the data conversion methods. The data converting device 7 evaluates a predetermined procedure in step for data conversion, determines the data conversion method based on the evaluation result while referring to the procedure table, and executes the data conversion process by the determined data conversion method. The predetermined procedure used for determining the data conversion method may be provided commonly for both the data transfer directions or one for one data transfer direction and the other for the other data transfer direction.

The data conversion method may be selected by a parameter. The parameter may be input by the user or the application program. In this case, the data converting device 7 is provided with a parameter memory, and includes and manages a parameter table showing data conversion methods associated with parameters. The data converting device 7 receives a parameter and stores it in the parameter memory.

The data converting device 7, in step for data conversion, makes an access to the parameter memory to read a parameter out of the memory. The data converting device 7 looks up a data conversion method associated with the parameter in the parameter table, and executes a data conversion process by the data conversion method thus obtained.

In this instance, one parameter is assigned to one data transfer direction. By using this, the data conversion method can be switched between the first and second data converting methods. The data conversion method may be determined by evaluating the parameter by a predetermined procedure, not referring to the parameter table.

A parameter representing a system status may be used for selecting an intended data conversion method. In this case, the data converting device 7 includes a system status sensing portion, and a status table describing the correspondence of different system status and data conversion methods. To select the data conversion method, the data converting device 7 determines which system status is assigned to a parameter in step for data conversion. The system status to be assigned to the parameter may be determined previously or by a predetermined procedure. After determining the system status assigned to the parameter, the data converting device 7 determines the data conversion method referring to the status table, and executes a data conversion process.

The data conversion method may directly be selected on the basis of the result of evaluating a status of the system according to a predetermined procedure, without referring to the status table.

A specific example of the system-status basis data conversion method selection is a case where in an image display device, the data is converted in accordance with the number of colors that can be displayed and a resolution. In such an example that the image data stored in the magnetic disk unit 4 is that of 24-bit color and the number of colors the image display device can display is defined by 8-bit color, the data converting device 7 checks the number of color that can be displayed, by means of the system status sensing portion, selects a data conversion procedure for converting the image data of 24-bit color into the image data of 8-bit color, and executes a data conversion process according to the data conversion procedure. An intended data conversion method can be selected by using an attribute stored in the magnetic disk unit 4. The attribute may be a file attribute stored in the directory or an extension of the file. An attribute value that is stored for each block in the FAT may also be used. Further, a magic number that is stored in a preset location of several bytes in the file may be used for the same purpose. The magnetic disk unit 4 manages the page blocks, and stores and manages the attributes of these page blocks.

The temporary memory managing table stored and managed by the data converting device 7 additionally contains an item for the attribute. The data converting device 7 reads out the attribute associated with the page block from the magnetic disk unit 4, and writes the attribute into the attribute item in the temporary memory managing table. The data converting device 7 stores and manages an attribute table containing the correspondence of the attributes and the data conversion methods.

In step for data conversion, the data converting device 7 reads the attribute associated with the page block from the temporary memory device managing table, determines the data conversion method referring to the attribute table, and executes the data conversion process.

Figure 15:
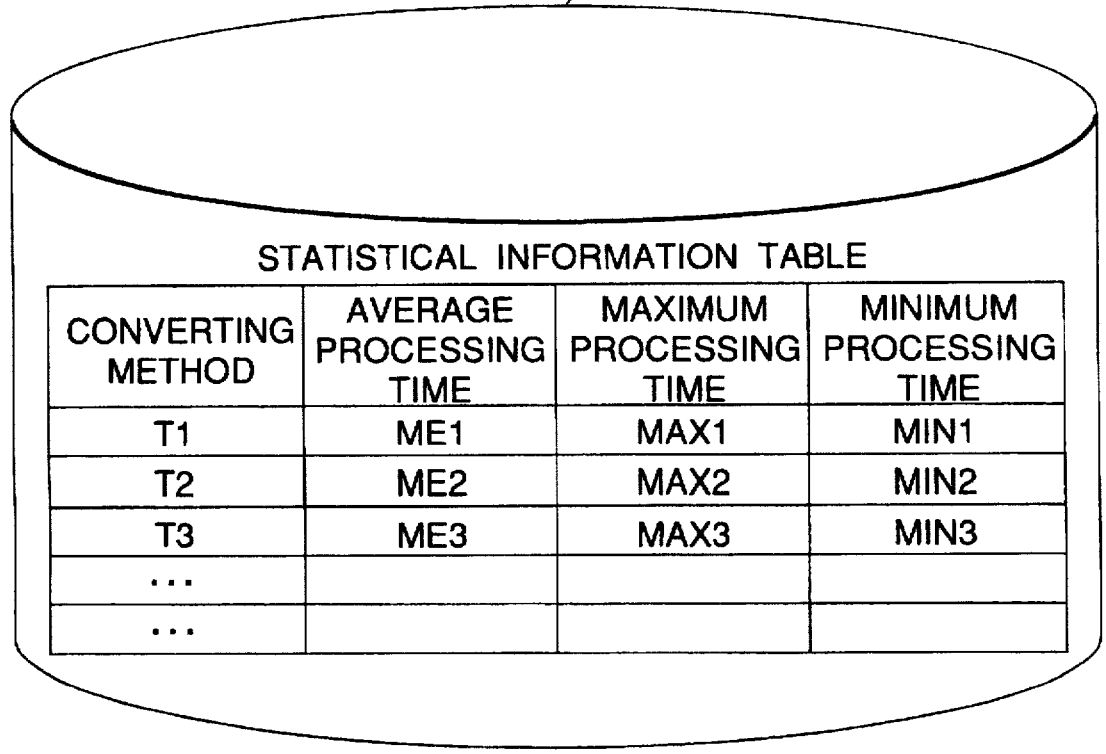
FIG. 15 is a diagram showing an example of the contents of a statistical information table.

The data conversion method may be selected by using statistical information that is used in the data conversion by the data converting device 7. In this case, the data converting device 7 contains the statistical information for data conversion in the form of a table. This table is called a statistical information table. FIG. 15 is a diagram showing an example of the contents of a statistical information table. In the table, each row contains the data conversion method, and the statistical information associated with the data conversion method. As shown in FIG. 15, the statistical information are an average processing time, an maximum processing time, and a minimum processing time for the data conversion. Other information may be contained in the data converting device 7, as a matter of course. The statistical information table is stored in the magnetic disk unit 4, and read out thereof into the data converting device 7 when required.

To select the data conversion method, the data converting device 7 evaluates the information in the statistical information table contained therein according to a predetermined procedure, and selects the data conversion method on the basis of the evaluation result. This predetermined procedure may be contained in the data converting device 7 or supplied from the application program. One of the possible way is to give a pointer to the evaluation procedure, with the procedure as one of the arguments of the map function already referred to.

Figure 16:
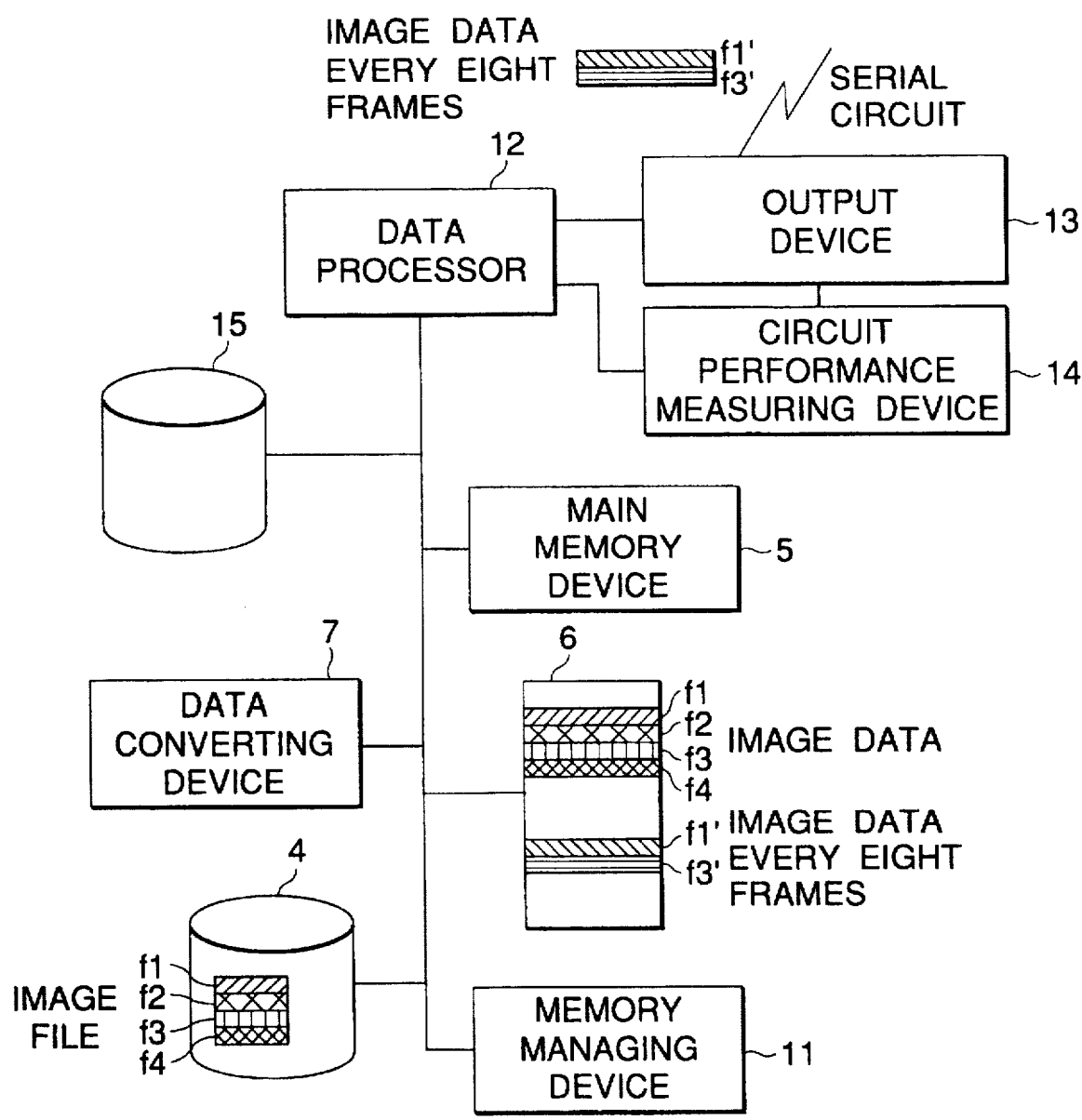
FIG. 16 is a block diagram showing an example of the application of the information storage system of the present invention where it is applied to the processing of image data.

An application of the information storage system of the present invention will be described. FIG. 16 is a block diagram showing an example of the application of the information storage system of the present invention where it is applied to the processing of image data. In the figure, like or equivalent portions are designated by like reference numerals in FIG. 1. Reference numeral 11 designates a memory management unit; 12, a data processor; 13, an output unit; 14, a circuit performance measuring device; and 15, a line performance data base. In this example, image data expressed in terms of a specific frame rate are stored as image data files in the magnetic disk unit 4. The image data is read out at a desired frame rate according to the transfer rate of the communication line. The image data file is expressed by 30 frames per second, and the image data of one frame is expressed by 1 KB. The memory management unit 11 has both the functions of the main memory managing device 1 and the temporary memory managing device 3 shown in FIG. 1. The output unit 13 outputs image data to a serial circuit. A user sees the image data output from the output unit 13. The circuit performance measuring device 14 measures the performances of the output unit 13, and sends the results of the measurement to the data processor 12. Information to check a status of the line on the basis of the measurement results is stored in the line performance data base 15.

A case where a user sees images of the image data files that is read out of the magnetic disk unit 4 and transmitted at 64K bits per second through the serial circuit, will be described. In this case, the image of 8 frames per second can be transmitted.

The application opens an image file, and drives a memory map system call with the first data conversion procedure as one of the arguments. A procedure to read out image data of 8 frames per second and to write it into the main memory device may be designated as the first data conversion procedure.

In the control to transfer the image data from the magnetic disk unit 4 to the temporary memory device 6 by the memory management unit 11, the data converting device 7 executes the first data conversion procedure to read out the image data of eight frames per second, stored into the temporary memory device 6, and transferred to the main memory device 5.

The application reads out, frame by frame, the frames of the image data that are developed in the main memory device 5, and processes the readout frames of image data. At this time, the image data developed in the main memory device 5 have been transferred to the main memory device 5 at the transfer rate of the serial circuit. Then, the application processes the image data independently of the transfer speed of the serial circuit.

Even when by an increase of the traffic density in the serial circuit during the monitoring of the image data, the data transmission capability of the line is reduced to the transmission of the image data of 5 frames per second, a data conversion procedure to read out the image data of 5 frames per second is designated and the readout image data is mapped again. In this way, the application copes with the increase of the traffic density in the serial circuit.

The number of frames capable of providing an uninterrupted and smooth monitoring of the image data when the image data is read out, viz., an optimum frame rate, may be determined by executing a line performance measuring procedure for measuring the transfer rate of the communication line and the traffic density thereof. It is for this reason that in the example of FIG. 16, the circuit performance measuring device 14 is provided. The data processor 12 executes a given procedure using the results of the measurement by the circuit performance measuring device 14, determines a line status corresponding to the measurement results while referring to the line performance data base 15, and selects a data conversion procedure well suitable for the measurement results.

Figure 17:
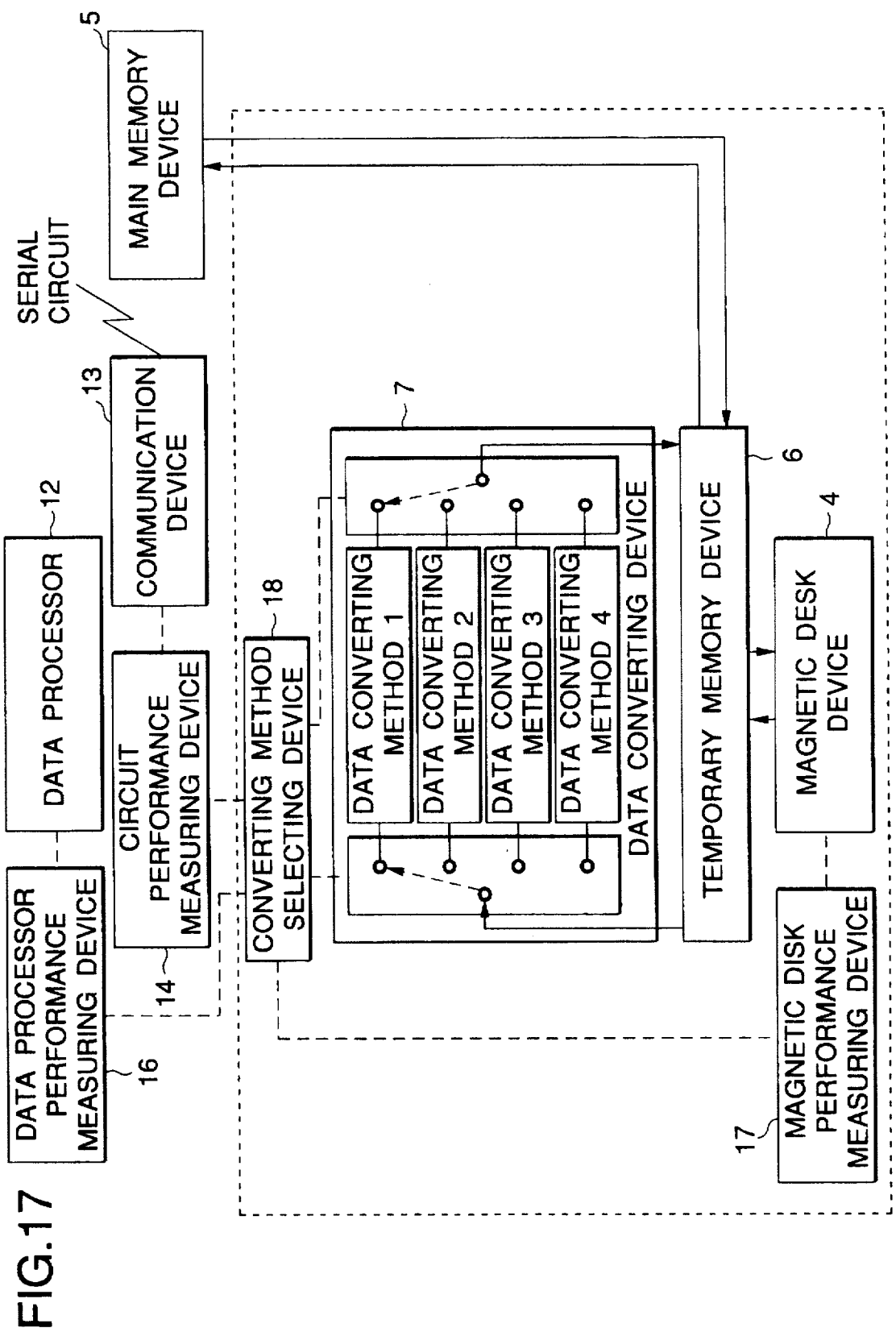
FIG. 17 is a block diagram showing another example of the application of the information storage system of the present invention where it is applied to the processing of image data.

FIG. 17 is a block diagram showing another example of the application of the information storage system of the present invention where it is applied to the processing of image data. In the figure, like or equivalent portions are designated by like reference numerals in FIG. 16. In FIG. 17, reference numeral 16 designates a data processor performance measuring device; 17, a magnetic disk performance measuring device; and 18, a converting method selecting device. The arrangement of this example includes the data processor performance measuring device 16 for measuring the performances of the data processor 12, and the magnetic disk performance measuring device 17 for measuring the performances of the magnetic disk unit 4, in addition to the arrangement of FIG. 16. The data signals representative of the results of the measurements from the circuit performance measuring device 14, the data processor performance measuring device 16, and the magnetic disk performance measuring device 17 are input to the converting method selecting device 18. The converting method selecting device 18 determines an optimum frame rate on the basis of the measurement results from those measuring units, and selects an image data conversion method best for the determined frame rate. The data converting device 7 carries out a data conversion process by the data conversion method selected by the converting method selecting device 18, and generates image data of the optimum frame rate.

This example thus arranged determines the optimum frame rate on the basis of the evaluations of the performances of the data processor and the disk unit, in addition to the transfer speed and the traffic density of the serial circuit. Therefore, an optimum data transfer can be secured at all times while being from the access speed of the magnetic disk, and the traffic density of the data processor. Other performances may be evaluated additionally, as a matter of course.

In the examples of FIGS. 16 and 17, before the data transfer to the main memory device 5, the rate of the image data to be converted has been adjusted to the optimum one. The application can process the image data not caring about the frame rate, and prepares an application software independently of transfer rate, line status, system status, and the like.

Figure 18:
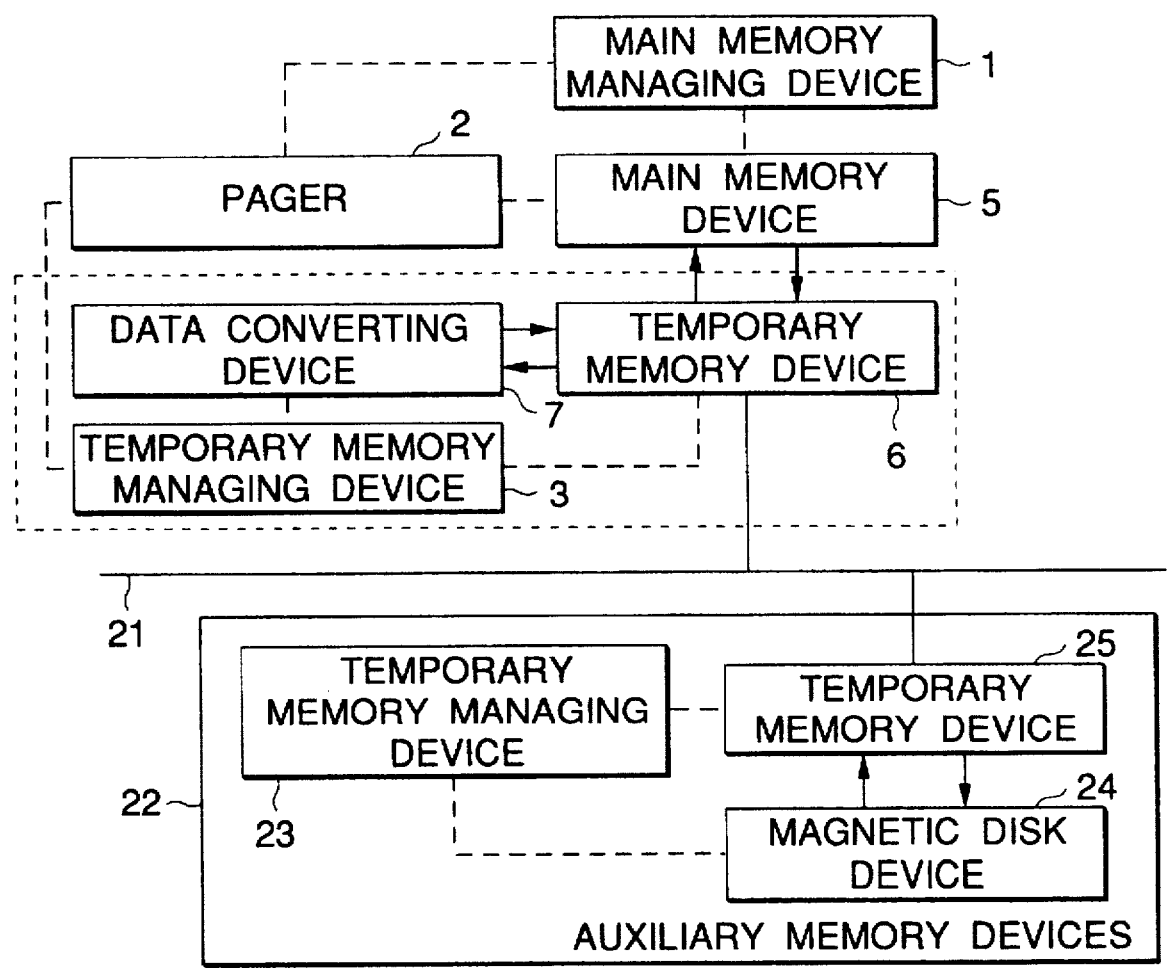
FIG. 18 is a block diagram showing an example of the application of the information storage system of the present invention where it is applied to a network.

FIG. 18 is a block diagram showing an example of the application of the information storage system of the present invention where it is applied to a network. In the figure, like or equivalent portions are designated by like reference numerals in FIG. 1. In FIG. 18, reference numeral 21 designates a network; 22, an auxiliary memory device; 23, a temporary memory managing device; 24, a magnetic disk unit; and 25, a temporary memory device. In this example, the information storage system is connected to the network 21 in place of the magnetic disk unit 4 (FIG. 1), and the network 21 is further connected to the auxiliary memory device 22. The auxiliary memory device 22 is made up of the temporary memory managing device 23, the magnetic disk unit 24, and the temporary memory device 25. Those units are substantially equal to the temporary memory managing device 3, the magnetic disk unit 4, and the temporary memory device 6.

The network 21 may be well known ETHERNET. The temporary memory device 6 communicates with the temporary memory device 25 by way of the network 21, and the operation is as described above.

For example, the auxiliary memory device 22 writes before-conversion data read out of the temporary memory device 25 into the temporary memory device 6 by way of the network 21. A known network protocol, e.g., TCP/IP protocol, is used for this communication. The data converting device 7 converts the received data into after-conversion data.

The data converting device 7 converts the after-conversion data that is read out of the temporary memory device 6 into the before-conversion data, and writes the before-conversion data into the temporary memory device 25 through the network 21. A known network protocol, e.g., TCP/IP protocol, is used for this communication.

In either case, the data converting device 7 may be provided in the auxiliary memory device 22. In this case, the data of the temporary memory device 25, not the temporary memory device 6, is converted. Alternatively, the data converting devices 7 may be provided in both the temporary memory devices 6 and 25, and the after-conversion data is obtained only during the communication through the network 21. In this case, the encoding and decoding by the data converting devices secures a security of data on the network 21. The data converting devices may be used for formatting the data into a communication format.

With use of this arrangement using the network, it is possible to realize a remote filing system in which data files are stored into a remotely located magnetic disk, by way of the network. A plural number of auxiliary memory devices may be interconnected by the network. In this case, the temporary memory device 6 operates in cooperation with those auxiliary memory devices.

An application of the information storage system of the present invention where the information storage system is applied to an encoding and decoding system, will be described. The arrangement of FIG. 1 or FIG. 18 may be used for this application. An encoding procedure for converting an m number of blocks into an n number of blocks or a decoding procedure for converting an n number of blocks into an m number of blocks, may be used for the data conversion procedure executed by the data converting device 7. Particularly, a decoding procedure based on the encrypting method known as a DES algorithm, for example, is used for the first data conversion procedure. An encrypting procedure based on the DES algorithm is used for the second data conversion procedure.

The encrypting procedure and the decoding procedure may be stored into the magnetic disk unit 4, for example. To select the data conversion procedure, the application program specifies the encrypting and decoding conversion methods, and their key information. These pieces of information are specified as one of the parameters for the file open process, for example. These parameters are interpreted by the temporary memory managing device 3. The number of the conversion procedure determined by the two arguments for specifying the conversion procedure and the key information, is stored into the related location in the page table.

Alternatively, an entry for retaining key information may additionally be provided in the data converting table. FIG. 19 is a diagram showing an example of a data converting table used for encoding and decoding. To store the key information into the data converting table, the number of the conversion procedure is specified by the argument for specifying the conversion procedure, and then the key information is stored in the key information entry of the table. When driven, the conversion procedure starts while referring to the key information in the data converting table.

In this example, the data blocks stored in the magnetic disk device 4 are those encrypted according to the DES algorithm. A secrecy of stored information can be kept if the magnetic disk is stolen. As described above, the memory area of the temporary memory device 6 may be arranged into separate areas, one for before-conversion data and the other for after-conversion data. Therefore, the pages containing the decoded data and the pages containing the encrypted data may be managed separately. A paging method designed so as to inhibit the pages containing the decoded data from being paged out or another paging method designed so as to inhibit the decoded data from being written into the magnetic disk device 4 in any situation may be employed. When it is employed, writing the data not decoded, into the magnetic disk device 4 can be prevented. Therefore, information leakage caused by the access to the magnetic disk device 4 can be prevented.

Additionally, when this example is combined with the FIG. 18 information storage system with the network, it is prevented that the data not decoded is transferred to a remote magnetic disk device by the network communication. With this, information leakage occurring in the network communication can be prevented.

In this example, the application program may be prepared exclusive of the encrypting procedure for the data to be accessed and the decoding procedure thereof. By utilizing a procedure incorporated into a plural number of application programs, the programs may be packed into a module. This leads to the improvement of preparing the application programs. Further, there is eliminated such a disadvantage that each application must care the defective security management resulting from careless packaging. This provides an easy management.

Additionally, in this example, the data is encrypted and decoded in the data converting device 7. Therefore, it is easier to conceal the resource used for encrypting/decoding, such as data and temporary memory device than in the system in which a user process is used for the encrypting/decoding of data.

Figure 20:
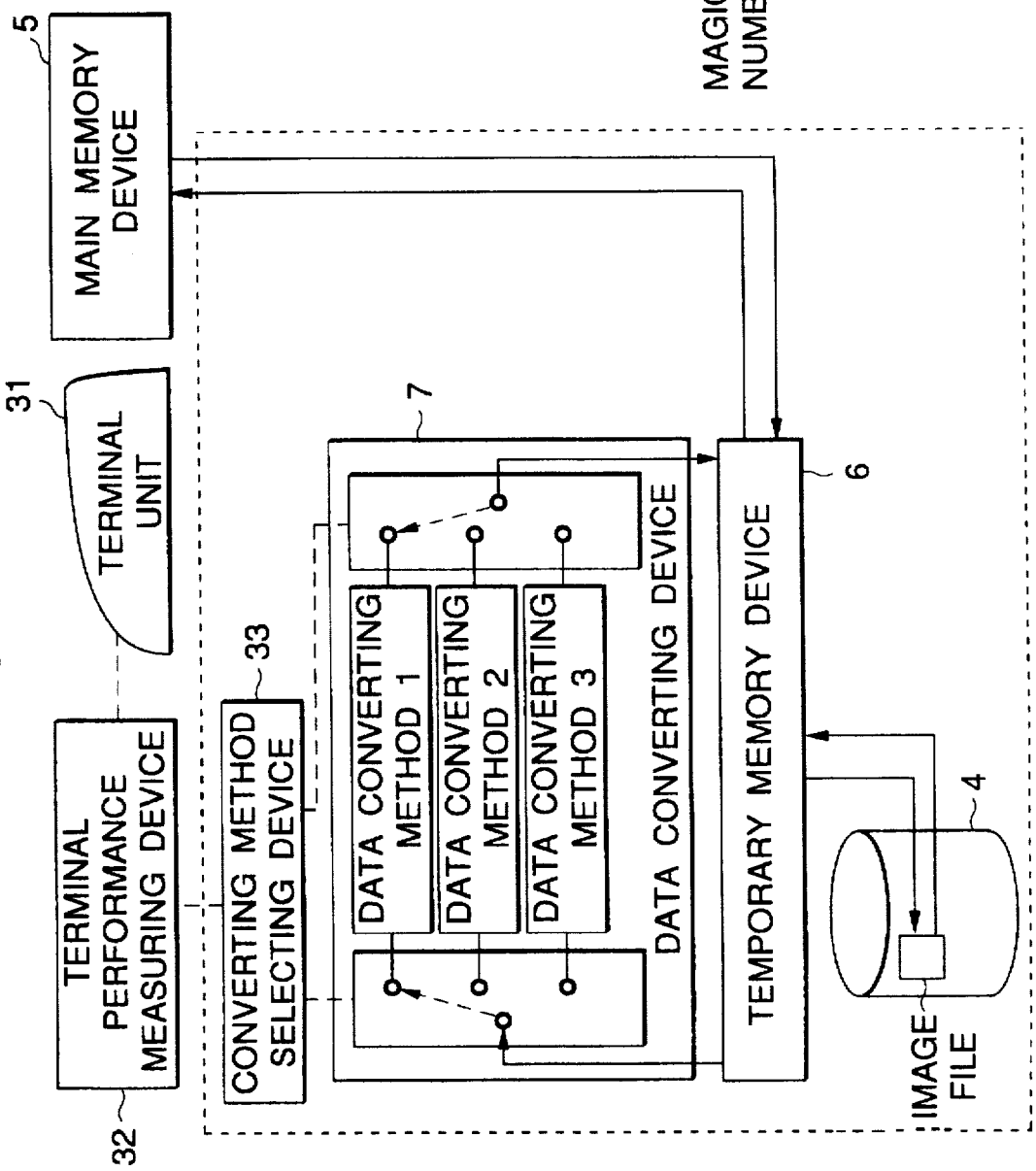
FIG. 20 is a block diagram showing an example of the application of the information storage system of the present invention where it is applied to image processings.

FIG. 20 is a block diagram showing an example of the application of the information storage system of the present invention where it is applied to image processings. In the figure, like or equivalent portions are designated by like reference numerals in FIG. 1. In FIG. 20, reference numeral 31 designates a terminal unit; 32, a terminal performance measuring device; and 33, a converting method selecting device. Description is given about a case where after an image data file of a specific tone and a specific resolution is stored into the magnetic disk device 4, an application to process an image at a resolution reads the image data file from the magnetic disk device 4 and writes the image data file at a desired resolution and a desired expression tone into the magnetic disk device 4 in accordance with the performances of the output device, for example, the terminal unit 31. The performances of the terminal unit 31 are measured by the terminal performance measuring device 32, and the converting method selecting device 33 selects a data conversion procedure from among the conversion procedures in the data converting device 7 on the basis of the measurement results. The data conversion is carried out by the selected data conversion procedure.

Description will be given using a specific case. In the description, the image data of the image data file stored in the magnetic disk device 4 represents an image of which the vertical side and the horizontal side of an image each consist of 600 pixels, and the resolution is 400 pixels per 25.4 mm. Each pixel is expressed by 256 tones for each of colors, red, blue, and green. The file name of the image data file is "A". The data conversion procedures contained in the data converting device 7 are three procedures for revolution conversion. The first to third data conversion procedures are respectively for converting the resolution from 400 pixels per 25.4 mm into 75 pixels per 25.4 mm, 100 pixels per 25.4 mm, and 200 pixels per 25.4 mm.

Other files containing exactly the same image data as that of the file A are named as A#75, A#100, A#300, and A#400. These files containing exactly the same image data may be obtained by copying the file A. Alternatively, a plural number of file names may be assigned to the same file by using the structures of the symbolic link and the hard link that are used in the file system of the conventional UNIX OS.

When the file A#75 is opened, a procedure to interpret the file name is executed, so that by using the numeric value 75 following the symbol # in the file name, the data conversion procedure for converting the resolution from 400 pixel/25.4 mm to 75 pixels/25.4 mm is designated. The designation of the data conversion procedure is expressed in the terms of the argument of the memory map system call.

As described above, by the memory map system call, an instruction to select the data conversion procedure for converting the resolution from 400 pixels/25.4 mm to 75 pixels/25.4 mm is registered in the data converting table. At the time of data transfer to the main memory device, the data converting device 7 carries out the resolution conversion. For this reason, the application reads the image data having the resolution of 75 pixels/25.4 mm from the magnetic disk device 4 while being insensible of the image of 400 pixels/ 25.4 mm. The same thing is true for the files A#100 and A#200.

Application to output the file A containing the image data to a terminal device or a printer will be described. A user opens the image file, and converts the resolution of the image data to the resolution of 75 pixels/25.4 mm and maps the image data in the memory, in order to display the image by a display device having the resolution of 75 pixels/25.4 mm. To this end, an image processing procedure for the toner conversion of the image of 400 pixels/25.4 mm into the image of 75 pixels/25.4 mm is designated for the first conversion procedure. To designate the procedure, the number representative of the toner conversion procedure is issued in the form of the argument of the memory map system call.

The resolution of the terminal device or the printer to which the application outputs the image data may be measured by the terminal performance measuring device 32. On the basis of the measured resolution, the converting method selecting device 33 automatically selects the image processing procedure of toner conversion without any participation by the user.

Alternatively, the application refers to a system description file holding the resolution of the terminal device or the printer, or executes an enquiry procedure to enquire of another application holding the resolution of the terminal device or the printer. In this instance, the enquiry procedure enquires of the terminal device or the printer to obtain the resolution information. The application may designate the procedure by the argument of the map system call on the basis of the resolution. When an application is driven in a terminal device having the resolution of 75 pixels, the application communicates with the terminal device to confirm that the resolution of the terminal device is 75 pixels, in order to display the image file having the resolution of 400 pixels by the terminal device. Then, the application issues the argument of the memory map system call that is the number of the data conversion procedure for converting the resolution from 400 pixels to 75 pixels.

In this instance, the image data of 400 pixels per 25.4 mm is converted into the image data of 75 pixels per 25.4 mm by the data conversion procedure selected by the data converting device 7, and stored into the main memory device 5. For this reason, what the application for displaying the image data of the main memory device 5 on the display screen merely must be done is only to output the image data that is mapped on the main memory device 5 without taking any care of the resolution of the image data contained in the image data file in the magnetic disk device 4 and without carrying out any special resolution conversion process.

Figure 21:
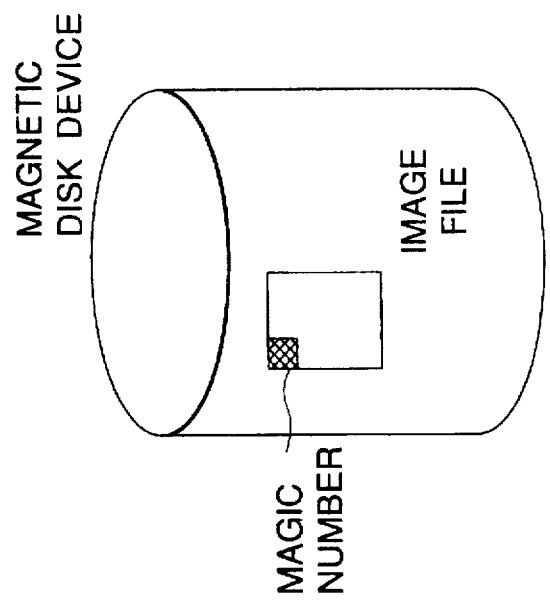
FIG. 21 is an explanatory diagram showing a magic number.

Also in the display device of which the resolution is 100 pixels/25.4 mm, not 75 pixels/25.4 mm, the resolution thereof is automatically measured by the terminal performance measuring device 32, and the data conversion procedure is automatically set up. Or the image processing procedure for converting the image data of 400 pixels into the image data of 100 pixels is merely designated as the first data conversion procedure by the argument of the memory map system call. Thus, the application can be prepared independently of the resolution of the output device. While the cases where the image data in the image data files have the same resolution have been described, there is a case where the image data in the image data files have different resolutions. A method of selecting the data conversion procedure in the latter case will be described. In this case, the method of selecting the data conversion procedure using a magic number, which is already referred to, may be used. FIG. 21 is an explanatory diagram showing a magic number. As shown in FIG. 21, a value of 21 bytes, which represents the resolution of the file data, is placed as a magic number at the head of the file. When the image data is opened, a procedure to read and interpret the two bytes at the head of the file is executed, the resolution is determined, and a proper data conversion procedure is selected.

It is assumed that image data of which the height and width include each 500 pixels, the resolution is 400 pixels/ 25.4 mm, each pixel being expressed by one byte, is stored in the form of an image file. The name of this file is A. It is assumed further that image data of which the height and width include each 600 pixels, the resolution is 200 pixels/ 25.4 mm, each pixel being expressed by one byte, is stored in the form of an image file. The name of this file is B.

It is assumed that the system includes six kinds of data conversion procedures: three data conversion procedures for converting the resolution from 400 pixels to 75 pixels, 100 pixels, and 200 pixels, and three data conversion procedures for converting the resolution from 200 pixels to 75 pixels, 100 pixels, and 200 pixels.

In the case of the display device having the resolution of 75 pixels per 25.4 mm, when the file A is opened, the system knows from the magic number that the resolution of the image data is 400 pixels/25.4 mm. Accordingly, the procedure for converting the resolution from 400 pixels to 75 pixels is automatically selected as the resolution conversion procedure. When the file B is opened, the procedure converting the resolution from 200 pixels to 75 pixels is selected according to the magic number.

Also in this instance, the image data mapped on the main memory device 5 is automatically converted into the image data having the resolution of 75 pixels/25.4 mm when the file A is opened and also when the file B is opened. Therefore, the application display the image data on the display screen of the display device irrespective of the resolution of the image data stored in the image data file.

This instance uses a number of the data conversion procedures for converting resolutions. In an alternative, a single versatile data conversion procedure or several kinds of data conversion procedures are used. The resolutions of the image data in the image files and the resolutions of the image data required for the application and the output device are applied as parameters to the data conversion procedure or procedures.

While the data conversion procedure for converting the resolution of the image data has been described, the same thing is correspondingly applicable to the conversion of tone and color. In this case, by designating a data conversion procedure for tone or color conversion, the data converting device converts color or tone of image data to the color or tone that can be processed by the application or can be expressed by the output device. The image data with the color or tone thus converted is transferred to the main memory device 5. Accordingly, the application may be prepared independently of color or tone.

Even if the resolution and tone of the terminal device are unknown to the user, those of the image data are automatically converted to those of the output device. In this respect, a good WYSIWYG (What You See Is What You Get) performance of the system is secured. For the resolutions, the tones, and the colors that are different for each type of the display device, the application may be formed independently of the type of the display device. Accordingly, the portability of the system is improved.

The image data conversion process is applicable to various image processings, such as rotation and enlargement/reduction of an image, cut-out of a specific image area or areas, composition of images, compression and expansion, in addition to the resolution, color and tone.

In the information storage system of the present invention, the area for storing the data before its resolution is converted and the area for storing the data after its resolution is converted may be managed separately. When the resolution of image data is concurrently converted into a plural number of resolutions, the data before its resolution is converted may be commonly used. Further, in the information storage system, the after-conversion data is formed by converting the before-conversion data. Therefore, by using a paging system designed so as to prohibit the before-conversion data from being paged out to the magnetic disk device 4, an efficient resolution conversion is realized independently of the data transfer rate when data is input to and output from the magnetic disk device 4.

While some specific applications of the information storage system of the present invention have been described, it should be understood to those skilled persons in the art that the present invention may variously be applied to other various data processings.

As seen from the foregoing description, the information storage system of the present invention includes information on the data conversion. According to the data conversion information, the process executed at the time of data transfer is automatically switched, whereby the data conversion can be executed at the time of data conversion. Therefore, an information storage system flexibly operable for a variety of applications is realized. Particularly, when the information storage system is applied to the virtual storage system, the resultant virtual storage system is considerably flexible in use. The foregoing description of preferred embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An information storage system which transfers data between a main memory means which stores data in a block unit and an auxiliary memory means which stores data in a block unit for processing, the system comprising:

data conversion information holding means for holding conversion information which associates at least one first data block, corresponding to a data block stored in the auxiliary memory means, with a conversion procedure to convert the at least one first data block, and for holding plural second data blocks, each of which is generated by the conversion procedure and corresponds to a data block of the main memory means;

temporary memory means, which includes a plurality of blocks, each block stores the first data block or one of the second data blocks, for temporarily storing data to be transferred between the auxiliary memory means and the main memory means;

temporary memory managing means for holding a relationship which associates a block of the temporary memory means with the first data block, and associates a block of the temporary memory means with the second data block, and for managing data transfer between the auxiliary memory means and the temporary memory means in accordance with the relationship; and data converting means for reading out the one first data block from the temporary memory means, for converting the read first data block by using the conversion procedure associated with the read first data block to the plural second data blocks, and for writing each of the converted second blocks into a block of the temporary memory means in accordance with the conversion information held in the data conversion information holding means and the relationship held in the temporary memory managing means.

2. The information storage system according to claim 1, wherein said data conversion means stores a data conversion procedure previously prepared by a user.

3. The information storage system according to claim 1, further comprising:

main memory managing means for holding a page table indicating a relationship among the second data blocks to be stored in the main memory means, a physical address of the main memory means, and a logical address of a virtual memory, for managing an access to the virtual memory, and for managing the main memory means to determine one of the second data blocks to be paged-in or paged-out in accordance with the relationship of the page table; and a pager for issuing a command to the temporary memory managing means so as to transfer the one second data block to be paged-in, which is determined by the main memory managing means, from the temporary memory means to the main memory means, and for issuing a command to the main memory managing means so as to transfer the one second data block to be paged-out from the main memory means to the temporary memory means.

4. The information storage system according to claim 1, wherein said data conversion means includes a plurality of data conversion procedures, selects one or more data conversion procedures from among those data conversion procedures included therein in accordance with an instruction from said memory managing means, and converts transfer data according to the selected data conversion procedure when data is transferred.

5. The information storage system according to claim 4, wherein the selection of the data conversion procedure is performed on the basis of the result of executing a predetermined procedure.

6. The information storage system according to claim 4, wherein the selection of the data conversion procedure is performed in accordance with a parameter specified by a user.

7. The information storage system according to claim 4, wherein the selection of the data conversion procedure is performed on the basis of system status information or on an attribute of a page.

8. The information storage system according to claim 1, wherein the conversion information held in the data conversion information holding means further associates a reversal conversion procedure which converts the plural second data blocks to the at least one first data block, and wherein the data converting means reads out the plural second data blocks from the temporary memory means, converts the read plural second data blocks by using the reversal conversion procedure associated with the plural second data blocks to the at least one first data block, and writes each of the at least one first data block into a block of the temporary memory means, in accordance with the conversion information held in the data conversion information holding means and the relationship held in the temporary memory managing means.

9. The information storage system according to claim 8, wherein the temporary memory managing means releases a block of the temporary memory means in accordance with a control procedure, the control procedure being stored in a computer readable medium including instructions for:

selecting a block of the temporary memory means;

checking whether the selected block includes one of the plural first data blocks or the second data block, in accordance with the relationship and conversion information;

if the block includes the second data block, retrieving the data conversion information holding means for the second data blocks including the second data block in the selected block;

checking whether a found second data block is present in the temporary memory means in accordance with the relationship held in the temporary memory managing means;

if each found second data block is not present in the temporary memory means, checking whether at least one first data block which is associated with the found second data block by the data conversion information holding means, is present in the temporary memory means;

if the at least one first data block is not present in the temporary memory means, reading a first data block from the auxiliary memory means to collect at least one first data block from the read first data block and first data block stored in the temporary memory means;

activating the data converting means to convert the collected at least one first data block to plural second data blocks;

collecting necessary plural second data blocks for reversal conversion using the converted second data block as newly stored and the already existing second data block;

activating the data converting means to reversely convert the collected necessary plural second data blocks to at least one first data block;

writing the converted at least one first data block into the auxiliary memory means; and releasing the selected block of the temporary memory means.

10. The information storage system according to claim 8, wherein the temporary memory managing means transfers one-block data from the temporary memory means to the main memory means in accordance with a procedure comprising the steps of:

determining whether the one second data block to be transferred to the main memory means is present in the temporary memory means in accordance with the relationship;

if the one second data block to be transferred to the main memory means is not present in the temporary memory means, finding a conversion procedure necessary to generate a second data block to be transferred to the main memory means and at least one first data block associated with the second data block to be transferred to the main memory means, based on the conversion information held in the data conversion information holding means;

finding whether the at least one first data bock associated with the second data block to be transferred to said main memory means is present in the temporary memory means in accordance with the relationship held in the temporary memory means;

if the at least one first data bock associated with the second data block to be transferred to the main memory means is present in the temporary memory means, converting the at least first data block by corresponding conversion procedure, commanding the data converting means to generate the second data block to be transferred to the main memory means, then transferring the generated second data block to the main storage means;

if the at least one first data bock associated with the second data block to be transferred to the main memory means is not present in the temporary memory means, transferring the first data block from the auxiliary memory means to the temporary memory means; and converting the at least one first data block associated with the data to be transferred to the main memory means by the conversion procedure, commanding the converting means to generate data to be transferred to the main memory means, then transferring the generated second data block to the main memory means.

11. The information storage system according to claim 9, wherein the control procedure carried out by the temporary memory managing means to release a block of the temporary memory means further comprises the steps of:

if the selected block of the temporary memory means includes the second data block, searching the data conversion information holding means for plural second data blocks including the second data block included in the selected block;

retrieving a block from the temporary memory means which includes the second data block in accordance with the relationship; and releasing the retrieved block from the temporary memory means.

12. The information storage system according to claim 9, wherein the temporary memory managing means selects the second data block at the time of selecting a block from the temporary memory means.

13. An information storage system which transfers data between a main memory means which stores data in a block unit and an auxiliary memory means which stores data in a block unit for processing, the system comprising data conversion information holding means for holding conversion information which associates at least one second data block, corresponding to a data block stored in the auxiliary memory means, with a conversion procedure to convert the at least one second data block, and for holding plural first data blocks, each of which is generated by the conversion procedure and corresponds to a data block of the main memory means;

temporary memory means, which includes a plurality of blocks, each block stores one of the plural first data blocks or the second data block, for temporarily storing data to be transferred between the auxiliary memory means and the main memory means;

temporary memory managing means for holding a relationship which associates a block of the temporary memory means with the one first data block, and associates a block of the temporary memory means with the second data block, and for managing data transfer between the auxiliary memory means and the temporary memory means in accordance with the relationship;

data converting means for reading out the one first data block from the temporary memory means, for converting the read at least one second data block by using the conversion procedure associated with the read at least one second data block, to the plural first data blocks and for writing each of the converted first blocks into a block of the temporary memory means in accordance with the conversion information held in the data conversion information holding means and the relationship held in the temporary memory managing means.

14. The information storage system according to claim 13, wherein the conversion information held in the data conversion information holding means further associates a reversal conversion procedure, which converts the plural first data blocks to the at least one second block, with the plural first data blocks and the at least one second data block, and wherein the data converting means reads out the plural first data blocks from the temporary memory means, converts the read plural first data blocks by using the reversal conversion procedure associated with the plural first data blocks to at least one second data block, and writes each of [the converted] at least one second data block into a block of the temporary memory means, in accordance with the conversion information held in the data conversion information holding means and the relationship held in the temporary memory managing means.

15. The information storage system according to claim 14, wherein the temporary memory managing means releases a block in accordance with a procedure comprising the steps of selecting a block in the temporary memory means;

determining whether the selected block corresponds to the first data block or the second data block based on the relationship and the conversion information;

if the block corresponds to the second data block, retrieving the at least one second data block including the second data block from the conversion information held in the conversion information holding means;

determining whether the at least one second data block is present in the temporary memory means based on the relationship held in the temporary memory managing means;

if the at least one second data block is not present in the temporary memory means, determining whether all of the plural first data blocks associated with the at least one second data block by the data conversion information holding means are present in the temporary memory means;

if all the plural first data blocks are not present in the temporary memory means, writing the first data block in the auxiliary memory means to the temporary memory means;

collecting a plurality of necessary first data blocks from the read first data block and first data block stored in the temporary memory means, converting the plurality of necessary first data blocks by the conversion procedure associated by the conversion information holding means, and commanding said data converting means to write the at least one second data block into the temporary memory means;

preparing at least one necessary second data block using the converted second data block newly stored and second data block already presented;

activating the data converting means to reversely convert the at least one second data block prepared using reversal conversion procedure associated with the at least one second data block into a plurality of first data block and storing the first data blocks in the temporary memory means; and writing the plurality of first data blocks stored in the temporary memory means into the auxiliary memory means.

16. The information storage system according to claim 14, wherein the temporary memory managing means transfers the second data block from the temporary memory means to the main memory means in accordance with a control procedure comprising the steps of:

checking whether the second data block to be transferred to the main memory means is present in the temporary memory means in accordance with the relationship;

if the second data block is not present in the temporary memory means, searching for the data conversion information holding means for a reversal conversion for generating at least one second data block including the second data block to be transferred and the plural first data blocks associated with the second data block to be transferred;

checking whether all the found plural first data blocks are present in the temporary memory means in accordance with the relationship;

if all the found plural first data blocks are present, activating the data converting means to reversely convert the found plural first data blocks to at least one second data block including the second data block to be transferred, and then transferring the second data block to the main memory means;

if all the found plural first data blocks are not present, transferring the first data block which is not present, from the auxiliary memory means to the temporary memory means; and activating the data converting means to reversely convert the found plural first data blocks to at least one second data block including the second data block to be transferred, and then transferring the second data block to the main memory means.

17. The information storage system according to claim 15, wherein the control procedure carried out by the temporary memory managing means further comprises the steps of:

if a selected block of the temporary memory means includes the second data block, finding at least one second data block associated with the selected second data block from the conversion information held in the conversion information holding means;

retrieving a block of the temporary memory means in which at least one second data block retrieved using the corresponding relationship is stored; and releasing a plurality of retrieved blocks.

18. The information storage system according to claim 15, wherein the temporary memory managing means selects the second data block at the time of selecting a block of the temporary memory means.

* * * * *

UNITED STATES PATENT AND TRADEMARK OFFICE
CERTIFICATE OF CORRECTION

PATENT NO. : 5,787,487
DATED : July 28, 1998
INVENTOR(S) : HASHIMOTO et al.

It is certified that error appears in the above-identified patent and that said Letters Patent is hereby corrected as shown below:

Claim 10, column 28, line 52, "bock" should read --block--.

Claim 10, column 28, line 57, "bock" should read --block--.

Claim 10, column 28, line 66, "bock" should read --block--.

Claim 14, column 30, line 9, after "each of ", delete "[the converted]".

Signed and Sealed this

Twenty-second Day of June, 1999

Attest:

Q. TODD DICKINSON

*Attesting Officer*    *Acting Commissioner of Patents and Trademarks*